US011698647B2

United States Patent
Doyle et al.

(10) Patent No.: US 11,698,647 B2
(45) Date of Patent: Jul. 11, 2023

(54) FLUID DISTRIBUTION MANIFOLD

(71) Applicant: Hayward Industries, Inc., Berkeley Heights, NJ (US)

(72) Inventors: Kevin Doyle, Pompano Beach, FL (US); William Weiss, Parkland, FL (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 0 days.

(21) Appl. No.: 17/327,543

(22) Filed: May 21, 2021

(65) Prior Publication Data

US 2022/0269293 A1   Aug. 25, 2022

Related U.S. Application Data

(63) Continuation of application No. 17/185,897, filed on Feb. 25, 2021, now Pat. No. 11,137,780.

(51) Int. Cl.
*G05D 7/06*     (2006.01)
*F16K 27/00*    (2006.01)
(Continued)

(52) U.S. Cl.
CPC ............ *G05D 7/0652* (2013.01); *E04H 4/12* (2013.01); *F16K 27/003* (2013.01);
(Continued)

(58) Field of Classification Search
CPC ...... F16K 11/22; F16K 27/0263; F16K 27/12; G05D 7/0652; G05D 7/0664; E04H 4/12; Y10T 137/87877
See application file for complete search history.

(56) References Cited

U.S. PATENT DOCUMENTS 3,157,597 A   11/1964   Burba
4,404,861 A    9/1983   Wass
(Continued)

FOREIGN PATENT DOCUMENTS

AU   2006200701 A1   9/2006
CA      2614643 C    11/2009
(Continued)

OTHER PUBLICATIONS

Jimmy C. K. Tong, et al., Attainment of Flowrate Uniformity in the Channels That Link a Distribution Manifold to a Collection Manifold, Mar. 28, 2007, Fluids Engineering Division of ASME, vol. 129 (Year: 2007) (7 pages).

(Continued)

*Primary Examiner* — Angelisa L. Hicks
(74) *Attorney, Agent, or Firm* — McCarter & English, LLP

(57) ABSTRACT

A housing assembly for a manifold includes a first housing with an inlet and a plurality of outlets, a second housing, and a valve retainer engaged with the first and second housings. The valve retainer includes a retention plate defined between first and second surfaces, a plurality of slot walls extending from the first surface, and a protruding edge that extends from a flanged lip and surrounds the plurality of slot walls. The retention plate defines a plurality of slots corresponding to the plurality of slot walls. The first housing may define a groove that receives the protruding edge, and the second housing may include a rim that engages the flanged lip of the valve retainer. Valve housings including first and second mating structures separated by wall segments may be positioned in outlets of the first housing and corresponding slots of the valve retainer.

28 Claims, 18 Drawing Sheets

(51) Int. Cl.
*F16K 27/12* (2006.01)
*F16L 41/03* (2006.01)
*E04H 4/12* (2006.01)
*F16K 27/02* (2006.01)
*G01F 1/05* (2006.01)

(52) U.S. Cl.
CPC .......... *F16K 27/0263* (2013.01); *F16K 27/12* (2013.01); *F16L 41/03* (2013.01); *G01F 1/05* (2013.01)

(56) References Cited

U.S. PATENT DOCUMENTS

| | | | |
|---|---|---|---|
| 4,465,593 A | 8/1984 | Wemhoff | |
| 4,789,132 A | 12/1988 | Fujita et al. | |
| 4,838,483 A | 6/1989 | Nurczyk et al. | |
| 4,948,091 A | 8/1990 | Satoh et al. | |
| 5,287,567 A | 2/1994 | Eash et al. | |
| 5,422,014 A | 6/1995 | Allen et al. | |
| 5,566,717 A | 10/1996 | Robert | |
| 5,669,221 A | 9/1997 | LeBleu et al. | |
| 5,979,493 A | 11/1999 | Simpkins, Jr. | |
| 6,058,718 A | 5/2000 | Forsberg et al. | |
| 6,227,223 B1* | 5/2001 | Crochet .................. | F16K 27/07 105/377.07 |
| 6,230,558 B1 | 5/2001 | Miwa et al. | |
| 6,279,177 B1 | 8/2001 | Gloodt | |
| 6,487,919 B1 | 12/2002 | Edwards | |
| 6,557,777 B1 | 5/2003 | Pevnick | |
| 6,913,203 B2 | 7/2005 | DeLangis | |
| 7,373,787 B2 | 5/2008 | Forsberg et al. | |
| 7,681,436 B2 | 3/2010 | Biberger | |
| 7,815,396 B2 | 10/2010 | McFarland et al. | |
| 7,854,597 B2 | 12/2010 | Stiles, Jr. et al. | |
| 7,942,071 B2 | 5/2011 | Claisse et al. | |
| 8,281,647 B2 | 10/2012 | Boutet et al. | |
| 8,459,100 B2 | 6/2013 | Biberger | |
| 8,600,566 B1 | 12/2013 | Longo et al. | |
| 8,606,413 B2 | 12/2013 | Picton | |
| 8,833,405 B2 | 9/2014 | Phallen et al. | |
| 9,241,604 B2* | 1/2016 | Dries .................. | A47L 15/4223 |
| 9,470,336 B2* | 10/2016 | Huffington ............... | E03C 1/042 |
| 9,581,478 B1 | 2/2017 | Smith | |
| 9,670,918 B2 | 6/2017 | Mueller | |
| 9,695,954 B2 | 7/2017 | Da Pont et al. | |
| 9,777,733 B2 | 10/2017 | Stiles, Jr. et al. | |
| 9,857,805 B2 | 1/2018 | Halimi | |
| 9,938,741 B1 | 4/2018 | Goettl | |
| 10,253,515 B2 | 4/2019 | Rejniak et al. | |
| 10,261,523 B2 | 4/2019 | Khabbaz et al. | |
| 10,452,061 B2 | 10/2019 | Yenni et al. | |
| 10,487,813 B2 | 11/2019 | Mueller | |
| 10,508,423 B2 | 12/2019 | Herbert et al. | |
| 10,508,753 B2 | 12/2019 | Ravedati et al. | |
| 10,514,172 B2 | 12/2019 | Acker | |
| 10,538,979 B2 | 1/2020 | Jones et al. | |
| 10,663,959 B2 | 5/2020 | Yenni et al. | |
| 10,883,730 B2 | 1/2021 | Wang et al. | |
| 10,901,438 B2 | 1/2021 | Klein et al. | |
| 10,918,569 B2 | 2/2021 | Collins et al. | |
| 11,041,579 B2 | 6/2021 | Lopez et al. | |
| 11,061,392 B2 | 7/2021 | Yenni et al. | |
| 11,122,669 B2 | 9/2021 | Potucek et al. | |
| 11,137,780 B1 | 10/2021 | Doyle et al. | |
| 11,204,106 B1 | 12/2021 | Doyle et al. | |
| 11,208,822 B2 | 12/2021 | Doan et al. | |
| 11,215,175 B2 | 1/2022 | Doan et al. | |
| 11,221,637 B1 | 1/2022 | Doan et al. | |
| 11,307,600 B2 | 4/2022 | Doan et al. | |
| 2002/0029804 A1 | 3/2002 | Liorati et al. | |
| 2002/0069646 A1 | 6/2002 | Yeung | |
| 2004/0215778 A1 | 10/2004 | Hesse et al. | |
| 2005/0081642 A1 | 4/2005 | Nehl et al. | |
| 2005/0119766 A1 | 6/2005 | Amundson et al. | |
| 2005/0217260 A1 | 10/2005 | Desjardins et al. | |
| 2006/0168611 A1 | 7/2006 | Fima | |
| 2006/0283789 A1 | 12/2006 | Kadlec et al. | |
| 2007/0034644 A1 | 2/2007 | Bertucci et al. | |
| 2007/0114162 A1 | 5/2007 | Stiles et al. | |
| 2008/0087330 A1 | 4/2008 | Burlage et al. | |
| 2008/0148471 A1 | 6/2008 | Tatum | |
| 2008/0168599 A1 | 7/2008 | Caudill et al. | |
| 2009/0078038 A1 | 3/2009 | Ushigusa et al. | |
| 2009/0151801 A1 | 6/2009 | Gorman et al. | |
| 2009/0204263 A1 | 8/2009 | Love | |
| 2010/0018911 A1 | 1/2010 | VanZeeland | |
| 2010/0032492 A1 | 2/2010 | Grimm et al. | |
| 2010/0071800 A1 | 3/2010 | Kohler et al. | |
| 2010/0200475 A1 | 8/2010 | Kwon | |
| 2010/0237608 A1 | 9/2010 | Mosher | |
| 2010/0300213 A1 | 12/2010 | Fink et al. | |
| 2010/0300548 A1 | 12/2010 | DeVerse | |
| 2011/0083748 A1 | 4/2011 | Ellis et al. | |
| 2011/0130976 A1 | 6/2011 | Lamberti et al. | |
| 2011/0197977 A1 | 8/2011 | Henderson | |
| 2011/0265883 A1 | 11/2011 | Cruse et al. | |
| 2012/0017367 A1 | 1/2012 | Reeder et al. | |
| 2012/0192583 A1 | 8/2012 | Lifson et al. | |
| 2013/0319535 A1 | 12/2013 | Boger et al. | |
| 2014/0130487 A1 | 5/2014 | Akiyama et al. | |
| 2014/0130878 A1 | 5/2014 | Marinez | |
| 2014/0165719 A1 | 6/2014 | Williamson et al. | |
| 2014/0183957 A1 | 7/2014 | Duchesneau | |
| 2014/0230925 A1 | 8/2014 | Halimi | |
| 2014/0262998 A1 | 9/2014 | Wagner et al. | |
| 2014/0277772 A1 | 9/2014 | Lopez et al. | |
| 2014/0303757 A1 | 10/2014 | Pruchniewski et al. | |
| 2014/0314062 A1 | 10/2014 | Loebs | |
| 2015/0153744 A1 | 6/2015 | Didion et al. | |
| 2015/0159503 A1 | 6/2015 | Leininger et al. | |
| 2015/0292985 A1 | 10/2015 | Yenni et al. | |
| 2015/0315803 A1 | 11/2015 | Hamza et al. | |
| 2015/0319941 A1 | 11/2015 | Klein et al. | |
| 2016/0077530 A1 | 3/2016 | Moran et al. | |
| 2016/0077531 A1 | 3/2016 | Kucera et al. | |
| 2016/0238668 A1 | 8/2016 | Cordray et al. | |
| 2016/0290524 A1 | 10/2016 | Ferraz | |
| 2017/0027410 A1 | 2/2017 | Stoyanov et al. | |
| 2017/0053360 A1 | 2/2017 | Loeb et al. | |
| 2017/0070842 A1 | 3/2017 | Kulp et al. | |
| 2017/0190602 A1 | 7/2017 | Porat et al. | |
| 2017/0211711 A1* | 7/2017 | Ritter ......................... | E03C 1/04 |
| 2018/0039236 A1 | 2/2018 | Acosta Gonzalez | |
| 2018/0087938 A1 | 3/2018 | Neilson et al. | |
| 2018/0113481 A1 | 4/2018 | Faiczak | |
| 2018/0143052 A1 | 5/2018 | Xie et al. | |
| 2018/0148912 A1 | 5/2018 | Park | |
| 2018/0359969 A1 | 12/2018 | Millar | |
| 2018/0364654 A1 | 12/2018 | Locke et al. | |
| 2019/0024943 A1 | 1/2019 | Scott et al. | |
| 2019/0277119 A1 | 9/2019 | Campion | |
| 2019/0286172 A1 | 9/2019 | O'Dell et al. | |
| 2019/0314243 A1 | 10/2019 | MacCallum et al. | |
| 2019/0320626 A1 | 10/2019 | Wang et al. | |
| 2019/0368620 A1 | 12/2019 | Masen et al. | |
| 2020/0070796 A1* | 3/2020 | Braatz .................. | B60T 15/021 |
| 2020/0122185 A1 | 4/2020 | Carriere et al. | |
| 2020/0123952 A1 | 4/2020 | DeHart et al. | |
| 2020/0182236 A1 | 6/2020 | Beisel et al. | |
| 2020/0201365 A1* | 6/2020 | Shimizu .................. | F16K 37/005 |
| 2021/0011500 A1 | 1/2021 | Halimi et al. | |
| 2021/0039129 A1 | 2/2021 | Bolan et al. | |
| 2021/0283724 A1 | 9/2021 | Dessart et al. | |
| 2021/0298557 A1 | 9/2021 | Budampati et al. | |
| 2021/0300804 A1 | 9/2021 | Broga et al. | |
| 2021/0301985 A1 | 9/2021 | Brown et al. | |
| 2021/0309539 A1 | 10/2021 | Budampati et al. | |
| 2021/0324649 A1 | 10/2021 | Revilla et al. | |
| 2022/0113749 A1 | 4/2022 | Doan et al. | |
| 2022/0125677 A1 | 4/2022 | Doan et al. | |

(56) References Cited

U.S. PATENT DOCUMENTS

FOREIGN PATENT DOCUMENTS

| CN | 204225208 | U | | 3/2015 | |
|---|---|---|---|---|---|
| CN | 104879534 | A | * | 9/2015 | |
| CN | 106641422 | A | * | 5/2017 | |
| DE | 102014006511 | A1 | * | 11/2015 | .......... F15B 13/0885 |
| DE | 202016004416 | U1 | | 8/2017 | |
| DE | 102014208261 | B4 | | 8/2020 | |
| EP | 2306257 | A1 | * | 4/2011 | ............ A61M 39/22 |
| FR | 2538834 | A1 | | 7/1984 | |
| JP | H07158295 | A | | 6/1995 | |
| WO | 2004/070242 | A1 | | 8/2004 | |
| WO | 2020/120973 | A2 | | 6/2020 | |
| WO | 2020/120974 | A2 | | 6/2020 | |
| WO | 2020/120975 | A2 | | 6/2020 | |
| WO | 2020/120977 | A2 | | 6/2020 | |
| WO | 2020/160658 | A1 | | 8/2020 | |
| WO | 2021/050932 | A1 | | 3/2021 | |
| WO | 2021/091773 | A1 | | 5/2021 | |
| WO | 2022/226361 | A1 | | 10/2022 | |

OTHER PUBLICATIONS

Mathieu Martin, et al., Direct Simulation Based Model-Predictive Control of Flow Maldistribution in Parallel Microchannels, Oct. 8, 2009, Journal of Fluids Engineering by ASME, vol. 131 (Year: 2009) (17 pages).
Office Action dated Apr. 26, 2021, in connection with U.S. Appl. No. 17/185,926 (15 pages).
Office Action dated May 6, 2021, in connection with U.S. Appl. No. 17/185,897 (9 pages).
Examiner Interview Summary dated May 17, 2021, in connection with U.S. Appl. No. 17/185,897 (2 pages).
Notice of Allowance dated May 28, 2021, in connection with U.S. Appl. No. 17/185,897 (7 pages).
Examiner Interview Summary dated Jun. 2, 2021, in connection with U.S. Appl. No. 17/185,926 (2 pages).
Office Action dated Jul. 20, 2021, in connection with U.S. Appl. No. 17/324,064 (11 pages).
Notice of Allowance dated Aug. 11, 2021, in connection with U.S. Appl. No. 17/185,926 (7 pages).
Office Action dated Aug. 12, 2021, in connection with U.S. Appl. No. 17/324,079 (18 pages).
Office Action dated Aug. 19, 2021, in connection with U.S. Appl. No. 17/324,069 (10 pages).
Interview Summary dated Sep. 15, 2021, in connection with U.S. Appl. No. 17/324,064 (2 pages).
Interview Summary dated Sep. 16, 2021, in connection with U.S. Appl. No. 17/324,069 (2 pages).
International Search Report and Written Opinion of the International Searching Authority dated Sep. 20, 2021, Issued in connection with International Application No. PCT/US2021/048117 (10 pages).
Interview Summary dated Sep. 24, 2021, in connection with U.S. Appl. No. 17/324,079 (2 pages).
Notice of Allowance dated Nov. 10, 2021, in connection with U.S. Appl. No. 17/324,064 (17 pages).
Corrected Notice of Allowability dated Nov. 24, 2021, in connection with U.S. Appl. No. 17/324,064 (5 pages).
Office Action dated Nov. 24, 2021, in connection with U.S. Appl. No. 17/327,488 (14 pages).
Office Action dated Dec. 27, 2021, in connection with U.S. Appl. No. 17/324,079 (24 pages).
Notice of Allowance dated Mar. 9, 2022, in connection with U.S. Appl. No. 17/324,064 (17 pages).
Notice of Allowance dated Apr. 12, 2022, issued in connection with U.S. Appl. No. 17/324,064 (18 pages).
Notice of Allowance dated Apr. 18, 2022, issued in connection with U.S. Appl. No. 17/324,069 (8 pages).
PCT International Search Report and Written Opinion of the International Searching Authority dated May 23, 2022, in connection with International Application No. PCT/US2022/017961 (10 pages).
Notice of Allowance dated Jun. 21, 2022, issued in connection with U.S. Appl. No. 17/324,064 (19 pages).
Notice of Allowance dated Jun. 23, 2022, issued in connection with U.S. Appl. No. 17/324,069 (7 pages).
Office Action dated Jun. 27, 2022, issued in connection with U.S. Appl. No. 17/327,488 (7 pages).
PCT Invitation to Pay Additional Fees dated Jul. 5, 2022, in connection with International Application No. PCT/US2022/026027 (3 pages).
Notice of Allowance dated Jul. 11, 2022, issued in connection with U.S. Appl. No. 17/327,488 (5 pages).
Notice of Allowance dated Jul. 18, 2022, issued in connection with U.S. Appl. No. 17/324,079 (8 pages).
PCT International Search Report and Written Opinion dated Sep. 2, 2022, in connection with Int'l Application No. PCT/US2022/026027 (11 pages).
Notice of Allowance dated Sep. 29, 2022, issued in connection with U.S. Appl. No. 17/324,064 (20 pages).
Notice of Allowance dated Oct. 14, 2022, issued in connection with U.S. Appl. No. 17/324,079 (8 pages).
Notice of Allowance dated Oct. 19, 2022, issued in connection with U.S. Appl. No. 17/324,069 (7 pages).
Notice of Allowance dated Oct. 19, 2022, issued in connection with U.S. Appl. No. 17/327,488 (7 pages).
Office Action dated Oct. 11, 2022, issued in connection with U.S. Appl. No. 17/558,349 (13 pages).

* cited by examiner

FLUID DISTRIBUTION MANIFOLD

CROSS REFERENCE TO RELATED APPLICATIONS

This application claims priority as a continuation of U.S. patent application Ser. No. 17/185,897, entitled "FLUID DISTRIBUTION MANIFOLD," filed Feb. 25, 2021, which is herein incorporated by reference in its entirety for all purposes.

This application is also related to co-pending U.S. patent application Ser. No. 17/327,488 filed on May 21, 2021, entitled "SYSTEMS AND METHODS FOR CONTROLLING FLUID FLOW WITH A FLUID DISTRIBUTION MANIFOLD," which is by Kevin Doyle and William Weiss, assigned to the assignee of the present application, and expressly incorporated by reference herein, in its entirety, for all purposes.

BACKGROUND

Fluid distribution systems, such as those employed to manage pool operations, can include one or more fluid handling devices—pumps (e.g., single speed, multi-step, variable speed, etc.), filters, valves, various plumbing components, cleaning systems, heaters, water features (e.g., fountains, sprays, etc.), and/or other types. In these fluid distribution systems, multiple valves may be used to direct flow from, to, and within the various fluid handling devices. However, incorporation of such valves can present multiple challenges to highly responsive and precise operation of fluid distribution systems due to operational limitations of the valves and the complexities of coordinated control of large numbers thereof.

Many fluid distribution systems require multiple valves and actuators to divert fluid flow to and from fluid handling devices, as well as different circuits, of those systems. To accomplish these functions, example valves can be manually actuated, provided with automatic actuators (e.g., electric motors), capable of being actuated to operate in multiple positions, or have a combination of these operational features. However, current valve actuators are limited in their respective abilities to precisely set flowrates due to the small ranges of available settings provided by their respective designs. In the case of a fluid distribution system for a pool, for example, an installer is very limited in how valves can be setup because each of the fluid handling devices in the fluid distribution system may require flow be supplied at predefined flowrates.

Some valves may include one or two flow paths, and can be set to one of two positions by an automation system, for example. The added flow path and/or flow rate-controlling positions these valves provide can help to simplify overall system complexity. However, fluid distribution systems including many and multiple of the previously mentioned fluid handling devices will still require a dramatically increased number of these valves relative to simpler systems. Greater numbers of valves and actuators increase overall system cost and complexity. Furthermore, larger numbers of valves increase installation costs for labor and materials because more time is required for installation due to system complexity, and more plumbing components (e.g., piping, unions, fittings, etc.) are required for actual valve installs. In addition, larger physical space is required for all the valves, actuators, and plumbing components used to operate such fluid distribution systems.

Along with increased costs and space requirements needed to provide and install fluid distribution systems having increased numbers of fluid handling devices, normal continuous operation and maintenance can require complex multi-component control systems. In some examples, each fluid handling device may require its own valve piped into a fluid circuit serving the component. In other examples, two components may share a valve connected to the fluid circuits that serve the two components. Each valve employed may include its own controller that has to be independently operated to provide a specific flow rate of fluid to the fluid handling device it serves. Various schemes may be required to operate valves so that fluid is directed to different components at specific flow rates required for proper operation. Controlling each valve in these fluid distribution systems requires accurate readings for a flow of fluid to, and more importantly a flow rate from, each valve.

Compounding the challenge of controlling multiple valves, is the variability in operational conditions a fluid distribution system can experience. Many of these systems may be used daily with overall flowrates reducing or increasing depending on a state of a given system that is subject to external conditions that vary in magnitude/effect and timing.

For example, dirty filters can reduce flow and cleaned filters can increase flow in a circuit of a fluid distribution system for a pool. The amount of debris that must be filtered by each filter can depend on a filter's location in the pool, number of trees or bushes near that location, and/or traffic of pool-goers around the location. In addition, new fluid handling devices can be introduced into the pool's fluid distribution system from time to time, rendering overall performance of the system more unpredictable and less stable. Any of these exemplary situations and conditions can cause cascading impacts on fluid flow rates in other circuits of the pool's fluid distribution system, and impact operations of other fluid handling devices and the valves that serve them. Thus, with overall performance being unpredictable and far from stable, performance of other fluid handling devices, such as the pool's cleaning systems or water features, can be negatively impacted.

As a result, a need exists for a fluid distribution manifold that can deliver precise specified flow rates from each outlet in group of outlets, each outlet connected to a different fluid handling device. In addition, a need exists a manifold that enable seamless integration of additional fluid handling devices to fluid system, such as those utilized in pool management systems. Still further, a need exists a manifold including individual valve assemblies that can be easily installed, serviced, or replaced without significantly disrupting the operation of the manifold or operations of other valve assemblies in the manifold.

SUMMARY

Examples described herein include systems and methods for controlling flow rates from a fluid distribution manifold. In one example, a fluid distribution manifold may include a first housing that defines first and second inlets, and first and second outlets. A first valve assembly may be provided in the manifold and configured to regulate flow from the first outlet with a first actuator connected and to a first valve member. A second valve assembly may be provided in the manifold and configured to regulate flow from the second outlet with a second actuator that is connected to a second valve member. In other examples, the manifold may include three or more outlet ports and three or more valve assemblies, each valve assembly regulating a flow rate through a respective outlet port.

The first housing may be engaged to a valve retainer that is engaged to the first and second valve assemblies. The valve retainer may secure the valve assemblies in their respective positions within a chamber defined by the first housing and one side of the valve retainer. In one example, the chamber is in open fluid communication with the first and second inlets for the manifold.

In some examples, a sensor assembly may be attached to a first housing proximate to first and second outlets. The sensor assembly may be configured to detect a first indication (e.g., a signal representing the occurrence of) of a first operation of the first valve assembly and a second indication of a second operation of the second valve assembly. In addition, a controller may be provided to direct independent operations of the first actuator based on a first flow rate derived from the first indication and independent operations of the second actuator based on a second flow rate derived from the second indication. In other examples, the first and second valve members may each be positioned within portions of a first housing and a second valve housing, respectively, that are in open fluid communication with the chamber.

In another example, a fluid distribution manifold may include a first housing that defines first and second inlets and first and second outlets, a second housing, and a valve retainer positioned between the first housing and the second housing. The valve retainer may define a first chamber with the first housing and define a second chamber with the second housing. First and second valve assemblies may be provided, with each including an actuator configured to adjust a position of a member within the first chamber to regulate a flow rate through a respective one of the first and second outlets.

In one example, a controller may be configured to direct independent operations of the actuators to move respective valve members in respective increments based on respective flow rates. In addition, the valve members for the first and second valve assemblies may both be positioned within portions of respective valve housings that are in open fluid communication with the first chamber and the first and second inlets for the manifold.

In yet another example, a method for distributing fluid with a fluid distribution manifold including a plurality of valve assemblies may include continuously monitoring a fluid system that includes a plurality of fluid handling devices that are in fluid communication with the fluid distribution manifold. The method may further include receiving control inputs with a valve operation and coordination ("VOC") controller; the control inputs may specify required flow rates for the fluid handling devices. In one example, the VOC controller can determine operating directions for actuators of the valve assemblies of based on current flow rates to the fluid handling devices as regulated by respective valves assemblies in the manifold.

In another example, a method can include controlling independent operations of valve assemblies to change one or more flow rates to one or more fluid handling devices, to required flow rates specified in the control input, while maintaining required flow rates to the remaining fluid handling devices. In addition, flow rate balancing operations can be continuously performed and include operating valve assemblies to deliver required flow rates to fluid handling devices based on current flow rates for all the valve assemblies, an input flow rate for the manifold, and a total output flow rate for the manifold. In one example, each of the valve assemblies may include an actuator connected to a valve member that is disposed in a portion of a respective valve housing that is in open fluid communication with a chamber of a manifold, which is in open communication with first and second inlets for the manifold.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
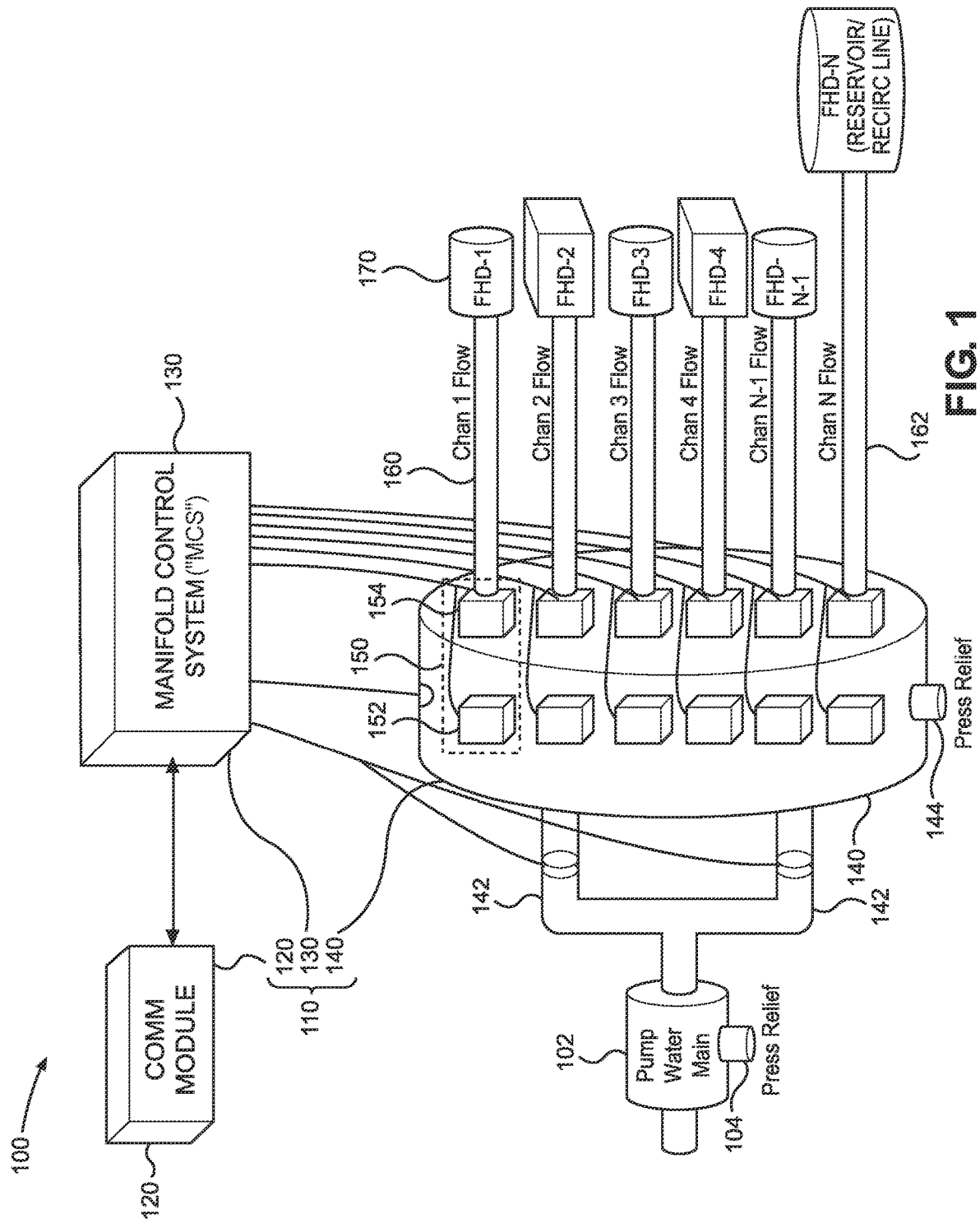
FIG. 1 illustrates is a schematic of an example fluid handling system including an exemplary fluid distribution manifold, according to an aspect of the present disclosure.

FIG. 1 illustrates a schematic of an example fluid handling system 100, according to an aspect of the present disclosure. As illustrated, the fluid handling system 100 includes a pump 102, a fluid distribution manifold 110 ("manifold 110"), and several fluid handling devices ("FHD" or "FHDs"). The manifold 110 includes a communication module 120, a manifold control system ("MCS") 130, and a chamber 140. The first chamber 140 may include a pair of inlets 142. Provided within the chamber 140 is N number of valve assemblies 150—each valve assembly 150 includes an actuator 152 and a flow sensor 154, and is configured to regulate a respective flow channel 160. In one example, N is equal to six.

In one example, the MCS may include: a computing device or a group of computing devices; one or more valve controllers that each include a respective computing device; a user interface that includes a display and controls for inputting information and reviewing information stored by the MCS; various types of inputs and outputs for power supply and data transfers, for example from actuators 152 and flow sensors 154 directly or through one or more valve controllers; and communication devices that implement one or more communication protocols (e.g., cellular, RS485, wireless—Wifi, Bluetooth, Zigbee, NFC, etc.) so as to be able to communicate with computing devices such as servers, personal computers, laptops, tablets, phones, etc. In another example, any of the exemplary valve controllers described herein and included in an exemplary MCS according to the present disclosure, may include a computing device. As used herein, a computing device may include any processor-enabled device, such as a laptop, tablet, personal computer, phone, or hardware-based server.

Each flow channel 160 can be in fluid communication with a fluid handling device 170 ("FHD 170"), such as a pump (e.g., a jet pump), a filter, a valve, a type of plumbing component, a cleaning system, a heater, or a water feature (e.g., fountain, spray, bubbler, etc.). Both the chamber 140 of the manifold 110 and the pump 102 may be provided with a pressure relief valve 104, 144.

At least one of the flow channels 162 may be in fluid communication with a fluid reservoir or a recirculation channel upstream of the inlets 142 or the pump 102. This flow channel 162 may be regulated as part of a process of balancing to all channels to obtain required flow rates in each of those channels.

Figure 2:
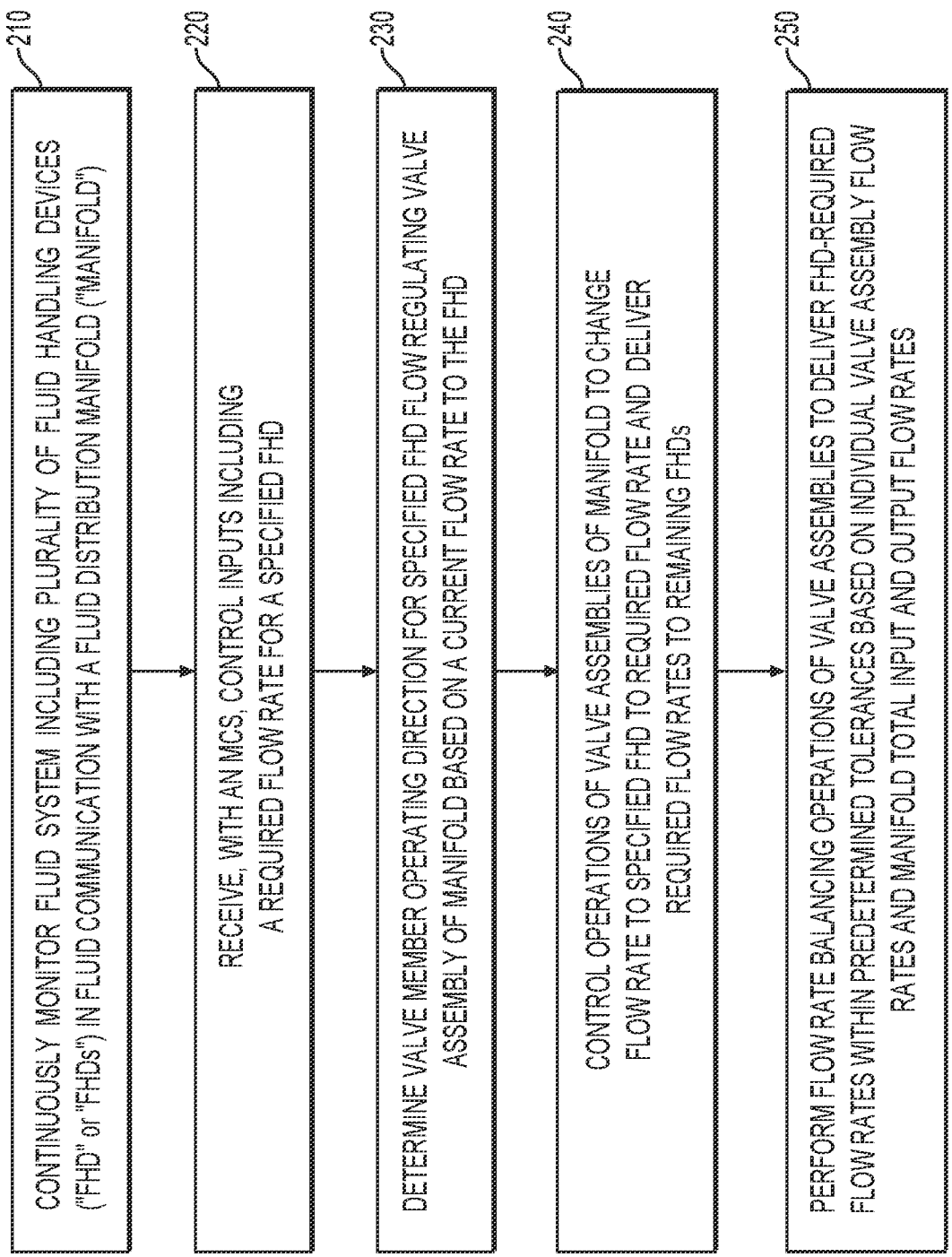
FIG. 2 is a flowchart for an example method for dynamically controlling flow rates of outlet ports of a fluid distribution manifold.

FIG. 2 is a flowchart of an example method for dynamically controlling fluid flow rates through outlet ports of a fluid distribution manifold with independently operated valves.

At stage 210, a fluid system including a plurality of fluid handling devices ("FHD" or "FHDs") in fluid communication with a fluid distribution manifold ("manifold") can be continuously monitored. This can include detecting flow rates, ON/OFF status, operating states, modes of operations, a show that is being executed by a pool system, and the like.

In stage 220, an MCS can receive a control input corresponding to a required flow rate for a specified FHD. In one example, the control input can be received through the MCS executing one or more processes that involve operations of a valve operation and coordination ("VOC") controller, individual valve controllers of a VOC controller, and/or different actuators for respective valve assemblies in the manifold. In another example, the control input can be received from an external controller, a pool system control ("PSC") panel, or an FHD served by the manifold.

In another example, a control input in stage 220 may include a flow rate that is required for a modified, initial, or continued operation of an FHD. In another example, the control input can correspond to a total flow rate for all the outlet ports of the manifold. In still another example, the control input may correspond to an indication for a valve to be opened or closed according to a current operation of an FHD regulating a fluid supply to that FHD. In still another example, the control input may include a flow rate, a magnitude of a valve opening or closing operation for a bleed valve assembly, or a flow rate for fluid through a bleed valve assembly.

In those examples where an initial control input relates to an operating magnitude, the initial control input may correspond to a specified distance of travel for a prime mover, number of rotations for a stepper motor actuator, magnitude of voltage to a linear motor or solenoid, and the like. In these examples, stage 220 can include converting the operating magnitude into a required flow rate or flow differential from a current flow rate. Accordingly, the converted flow rate value can be utilized by the MCS to monitor and adjust the opening of a valve assembly.

At stage 230, the MCS can determine an operating direction for a valve member corresponding to the specified FHD based on a current flow rate to the FHD. In one example, stage 230 may include determining that the valve assembly for the specified FHD cannot be operated to obtain the required flow rate. More specifically, it may be the case, and determined in stage 230, that a particular valve assembly is in a fully open position and the current flow rate is less than a required flow rate specified in the control input. As a result, the MCS will determine the operating direction of another valve assembly for the manifold that may result in increasing a flow rate through the valve assembly of the specified FHD. In one example in which the manifold employs a bleed valve assembly which is open, the MCS may determine that operating the bleed valve assembly in a closing direction will increase a flow rate through the valve assembly for the specified FHD. As a result, the MCS may control, or direct the valve controller for the bleed valve assembly to initiate a closing operation.

In stage 240, the MCS will control directly, or direct valve controllers to, execute independent operations of valve assemblies of the manifold to change a flow rate to specified FHD to required flow rate, and deliver required flow rates to the remaining FHDs. Stage 240 may include the MCS continuously polling flow sensors of all the valve assemblies for the manifold. Based on the readings from these sensors, actuators for all the valve assemblies will be operated continuously to maintain or modify flow rates therethrough in order to deliver the required flow rates through the valve assembly for the specified FHD.

In one example, stepper motors may be used as actuators in each of the valve assemblies installed in the manifold. In this example, stages 230 and 240 may include several operations specific to the stepper motors.

For example, a series of operations may be performed every millisecond (msec) that includes accessing a step counter for every actuator/fluid flow channel. For step counts greater than zero, it may be determined that the stepper motor actuators associated with those step counts are currently performing stepper movements. As a result, a flow rate comparison may not be done for each of these flow channels until stepper movements for a respective stepper motor actuators is finished being performed.

On the other hand, for step counts that are equal to zero, an actual flow rate may be compared to the required flow rate value. The step counters associated with these flow channels may be set to a default value of counts (e.g., 100 counts=50 steps), which will cause a step output pin for those stepper motor actuator to be toggled. In one example, this toggling may repeat every 1 msec until a number of steps corresponding to the value set for the step counters are completed. With a completion of every step (e.g., when a step output signal is toggled low), a home switch associated may be checked. If this open limit switch is ON then counts for stepper counters may be set to 0 since no further steps are needed.

A user interface may be checked on a predetermined periodic basis (e.g, every 50 msec) for new control inputs and to update a display with the most recent flow rate values. These updates may occur independently of any operation of the stepper motor actuators At stage 250, the MCS will direct operations of the valve controllers to continuously perform flow rate balancing operations of valve assemblies. These operations will continue such that the manifold delivers FHD-required flow rates within predetermined tolerances based on individual valve assembly flow rates, manifold total input, and output flow rates until a new control input is received.

Figure 3:
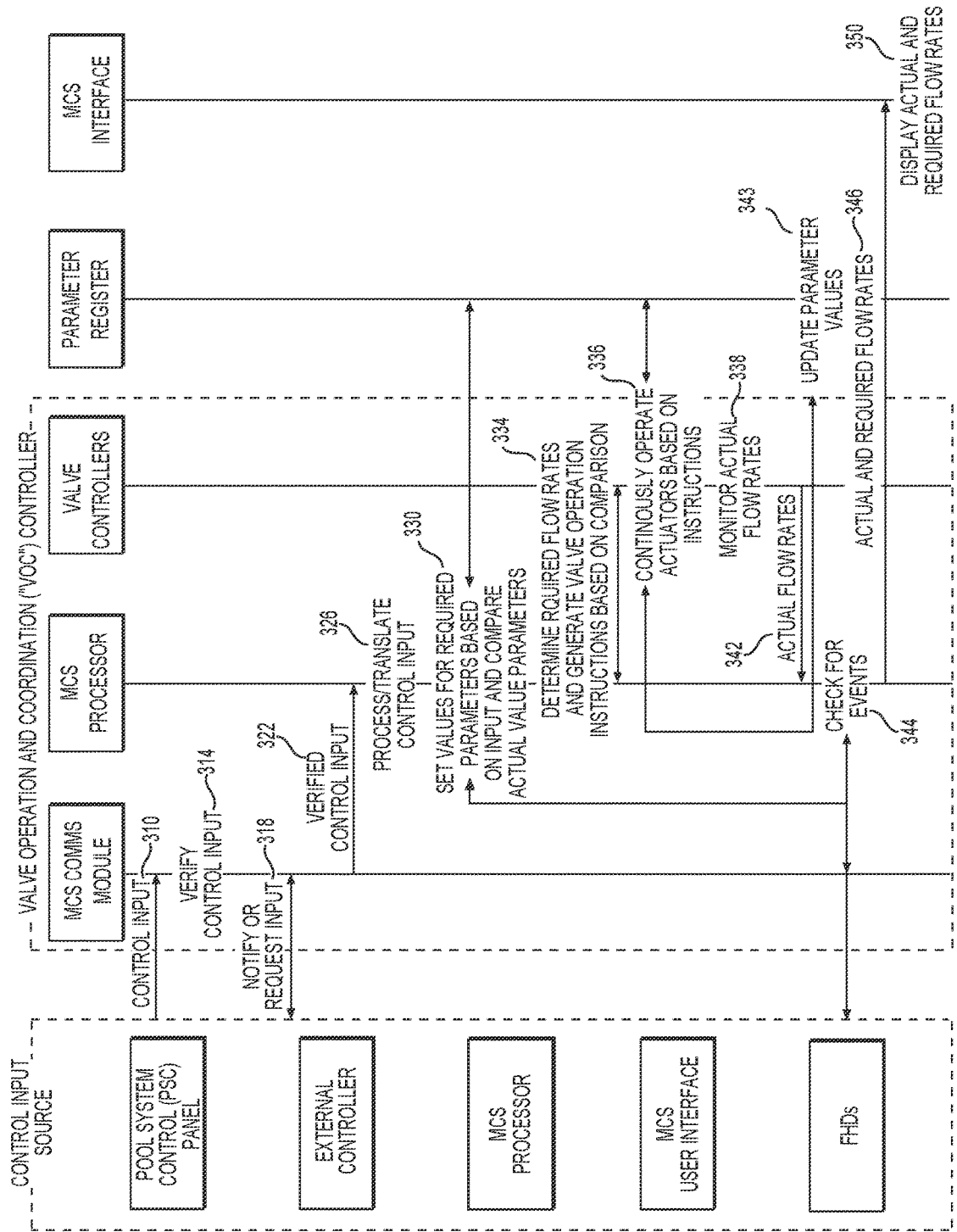
FIG. 3 is a sequence diagram of an example method for operating a fluid distribution manifold.

FIG. 3 is a sequence diagram of an example method for operating a fluid distribution manifold.

At stage 310, a control input is received by the MCS communication module ("comms module"). The control input may be received from any of the control input sources shown in FIG. 3.

In one example a control input may be transmitted from an external controller implementing a RS485 communication protocol. The control input may be generated or triggered when the external controller recognizes a new ON or OFF signal over a communication channel between an FHD and the external controller. In another example, the external controller may pick up the signal from a pool system control (PSC) panel that communicates with the FHD.

In yet another example, the control input may be communicated to the MCS comms module directly by the PSC panel. In this example, the control input may be presented as a message or according to a particular communication protocol such as RS485. In another example, a control input originating from the PSC panel could be defined as an interrupt signal.

In another example, the control input may be supplied through a user interface, for example, from a user using an LCD screen or control buttons provided on a manifold to set a specific valve opening and associated flow. In yet another example, a control input can be generated through an internal function of the MCS, that requires a setting for an actuator, such as a stepper motor, to change in response to a change in flow rate through a valve assembly including that actuator.

In stage 314, the comms module may verify the control input received in stage 310. In one example, the comms module can include a universal asynchronous receiver-Transmitter (UART) configured to generate an interrupt when the comms module receives a control input such as a byte of data from an interface implementing one or more communication protocols (e.g., RS485). Each byte from a UART buffer may be loaded into a register for the comms module to determine if a full control input (e.g., a message, series of signals, data string, etc.) has been received.

In one example, a verification process can include a data byte being taken from the UART when an interrupt occurs, and the comms module checking that the control input follows a valid input protocol. Where a correct protocol is followed, the comms module can store the data byte it received in the input buffer. In one example, the buffer may have a 12 byte capacity. Next, a cyclic redundancy check (CRC) for the comms module may be implemented to check the input. If the control input is complete and correct, this may cause a flag to be set with the MCS processor in stage 322 signifying that a verified control input has been received. In addition, in stage 322, data encompassed by the control input may then be transmitted to the MCS processor. In turn, a UART received input buffer may be cleared so that a subsequent control input can be received.

Before, or as the verified control input is received by the MCS processor in stage 322, the comms module can issue a notification at stage 318, depending on the source of the control input. This can convey that the control input has been verified, or include a request that the control input be re-submitted. In one example, if the control input is incorrect (e.g., not complete, includes invalid data), the comms module can notify the external controller or PSC panel, for example, and request a new control input, more of a control input, or an updated control input in stage 318. In another example, stage 318 may involve setting an error flag with the MCS processor and/or a control input source that indicates a type of error.

On the other hand, if a control input is correct a notification may be sent in stage 322 to a source for the control input like the external controller, in addition to the MCS processor as previously described. In addition, certain parameters tacked by the parameter register may be updated with a verifiable control input (e.g., a Control input Rec Reg Flag may be set to ON, a six data byte payload representing a channel flow rate value may be used to update a Channel Received Status Register parameter). In addition, the MCS processor may call a routine to translate or otherwise process the control input.

At stage 330, the MCS processor accesses a parameter register to set or reference values for parameters in the parameter registered therein that correspond to operating conditions (e.g., flow rate, valve opening degree, flow rate checking frequency, open/close status) as required based on the translated control input. In addition, the translated control input may be either compared directly or by reference to values set for corresponding required parameters, to values for actual, or current, or most recently determined parameters in the parameter register (e.g., flow rate for a valve assembly regulating flow to given FHD). In one example the MCS may check a status of a current register value for an outlet/valve assembly specified (or corresponding to an FHD specified), in the translated control input, versus a value included in the control input as a required value for that outlet, valve assembly, or FHD. These parameters may represent or correspond to various operating conditions, such as flow rate (required and/or current).

In one example, current and required values may correspond to current and required flow rates through an outlet regulated by the valve assembly specified, or corresponding to an FHD specified, in the control input. In another example, the values specified in the control input and stored in the parameter register may correspond to an opening degree of an outlet or position of a valve member. The MCS may do this comparison for every valve assembly as a matter of sequence; every valve assembly specified in the control input; or every valve assembly specified in the control input combined with every outlet for which a new status must be derived based on a required change for one of those outlets/valve assemblies that were specified.

In one example, current values stored in the parameter register that are compared to values specified in the control input, may be actual flow rate values (e.g., values in GPMs). The current actual values may be stored in the parameter register and derived from most recently processed signals from the flow monitoring components for the manifold and individual valve assemblies. In another example, the values stored in the register may include bytes of data that represent flow rates.

In yet another example, the values stored in the register and included in the control input for comparison to the current values in the parameter register may be representative of an open or close status of a valve assembly serving a particular FHD specified in the control input. For example, the control input may include data that generally indicates that a particular FHD is to go offline, and therefore does not require a continued supply of fluid for its operation. Accordingly, the control input may indicate that the FHD is going offline with the MCS processor as a valve assembly close status. The MCS processor may therefore recognize or assign a value corresponding to a closed state of a corresponding valve assembly, to a required flow rate value. Subsequently, this value can be compared with a current flow rate-related value held in the parameter register for the valve assembly that was specified in the control input (or valve assembly corresponding to an FHD specified in the control input).

In stage 334, the VOC controller (via the MCS processor alone, one or more valve controllers alone, or a combination of the MCS processor and one or more of the valve controllers) determines the required flow rates and valve operations (at least initial operations) required to provide those flow rates based on the comparison in stage 330. In addition, the VOC controller generates operating instructions based the comparison. In one example, operating instructions may include control signals, messages, an operating sequence, or the like. For any difference determined for any of the valve assemblies in a manifold managed by the MCS, the VOC controller may execute, or specify for execution, a specific series of operations.

In on example, a specific series of operations specified, generated, or otherwise caused to be executed, may depend on a current value in the parameter register associated with valve assemblies of a manifold. For example, a current flow rate value in the parameter register for a first valve assembly may correspond to an open valve status, and a control input may specify a close value. The MCS processor may set a required flow value parameter for the first valve assembly to a valve assembly close value register that is recognized for a communication and control channel corresponding to the first valve assembly.

Conversely, it can be the case that a current flow rate value in the parameter register for the first valve assembly corresponds to a closed valve status, and a control input may specify an open value. The MCS processor may set the required flow value parameter to an open value that is recognized for a specific communications channel corresponding to the first valve assembly. In one example, each communication and control channel for each valve assembly may have its own set of values that are recognized as open, closed, degrees closed, or degrees of open, and used for setting corresponding registers of the parameter register. for this channel.

At stage 336, the actuators valve assemblies are continuously operated by the valve controllers based on the instructions generated in stage 334. In one example, the MCS processor, or the valve controllers, or a combination thereof, will operate the valve assemblies for each fluid flow channel for which a flow rate must be changed based on the control input received in stage 310. In one example, positions of respective valve members will be changed until current flow rates are adjusted to match all the required flow rates specified, or derived from any flow rates specified, in the control input. In one example, the MCS processor or valve controllers can access the parameter register that is continuously updated with current flow rates, and compare these to the specified required flow rates In stage 338, the valve controllers continuously monitor actual flow rates from the valve assemblies as detected by a flow sensor for each valve assembly. The actual flow rates are reported to the MCS processor in stage 342.

In one example, Hall Effect devices may be used to measure a flow rate of fluid supplied to each fluid flow channel by a manifold of the present disclosure. More specifically, hardware provided for each Hall Effect device may generate a pulse (positive or negative) every time a magnet or other piece of hardware associated with a flow sensor installed in a valve assembly, passes by the Hall Effect device. In one example, the Hall effect device, or other type of fluid sensing component, may communicate directly or indirectly (via a valve controller) with an MCS processor, and be installed in: a manifold; a sensor assembly attached to a manifold; or a housing of a valve assembly installed in a manifold. In this latter example, the valve assembly may include both pieces of a hardware for sensing flow rates therethrough, and be equipped with a connector (e.g., terminal, electrical connector), or signal transmitting device that follows a particular communication protocol (e.g., a wireless protocol such as Bluetooth, NFC, Zigbee, WiFi, etc.), to convey signals indicating the flow rate to valve controllers and/or the MCS processor.

Regardless of the means of transmission, once the signals are received by the valve controllers and/or the MCS processor, a flow rate may be determined. In one example, the valve controllers may receive the signals from the flow sensors, determine a flow rate, and transmit this information to the MCS processor. In another example, the valve controllers may receive the signals which are then passed on to the MCS processor for flow rate determinations, which are then pushed back to the valve controllers. In still another example, the MCS processor may receive the transmitted signals and calculate the flow rates, which are then transmitted to the valve controllers.

In one example, a flow sensor includes magnets that may move with a flow of fluid through a valve assembly, and a Hall effect devices that may register the movement of the magnets. In one particular example, two magnets may be installed in each impeller positioned immediately downstream of a valve member-regulated opening in a valve assembly. Accordingly, the Hall effect device may register two pulses per revolution of the impeller.

With the arrangement discussed immediately above, the MCS processor, or a valve controller for a given valve assembly, may implement a timer interrupt tracking process to calculate a flow rate from the valve assembly in stage 338. In this process, the MCS processor or valve controller may include one more timers, and a counter to count a number of clock pulses between Hall Effect pulses. An increment for the counts per clock pulses may be set according to a desired accuracy. In one example, this ratio may be set at greater than 100 counts per clock pulse for a resulting flow rate calculation accuracy of better than 1%.

In one example, a current flow may be transmitted to the MCS processor in stage 342, may occur as soon as a Hall Effect pulse occurs. In on example, the parameter registered may be updated with the new flow rates in stage 343, just after or simultaneously with the update in stage 342. In one example, the VOC controller, inclusive of the MCS processor the valve controllers, may be equipped to determine an RPM based on signals from Hall effect devices such that: a 3.3 Hz signal corresponds to a low RPM of 100 RPM (i.e., (100 RPM)×(2 pulses/rev)×(60 sec/min)); a 33.3 Hz signal corresponds to 1000 RPM; and 133 Hz corresponds to a 4000 RPM maximum.

A timer function employed by the MCS processor and/or the valve controllers can be set up for each Hall Effect device and, in one example, may use a 32 KHz internal clock divided by a factor of two, and thereby provided 16,000 counts per second. Either the MCS processor or each of the valve controllers may incorporate a 16 or more bit counter configured to start counting clock pulses upon a registering a 0 value for a timer. In one example with this setup, when a Hall Effect rising edge occurs, an interrupt may be generated for the valve assembly in which the rising edge occurred. A flow rate value may be derived from a count and a time that are recorded or otherwise taken from the counter and the timer when the interrupt occurs. The counter may be reset at this point and initialized upon the timer being set to 0.

In another example, if a flow of fluid to a valve assembly stops, which may cause an impeller carrying flowing indicating magnets to stop rotating, a counter for counting clock pulses may be set to overrun at a preset number of counts (e.g., 65,000 counts) and generate an interrupt. This overrun interrupt may be processed and recognized by the VOC controller, as a flow channel with flow rate of 0. In one example, the MCS processor or valve control can be configured so that an overrun interrupt occur at 0.24 Hz (i.e., 16000 Hz/65K counts), or after 4 seconds of no Hall Effect device pulses.

In one example, one or more settings, flags, or other types of indicators can be checked on preset intervals, for example 1 millisecond (msec), and used to initiate or stop certain operations of the manifold. For example, a value for a master setting can be used to trigger different operations of the manifold, while the manifold is in the process of performing the various operations associated with the stages in FIG. 3, and others described herein. A value of this master setting may be checked concurrently with the performance of operations associated with stages 334 to 343. The master setting, in one example, can be set to one of two values to indicate whether or not a current cycle of operations should continue or another set of events should be checked for in stage 338. The MCS processor can check a value of the master setting every 1 msec, which may change upon a recognition that all valve assemblies have cycled through once or a predefined number of times since the reception of a most recent control input. In another example, the main setting may be changed upon the reception of a new command input.

In one example, one or more valve assemblies installed in a manifold may employ a stepper motor as an actuator for changing a position of a valve member. A setting for the master setting may be changed upon completing the generation of 500 Hz stepper pulses for a required flow rate change. If such a stepper control is completed, a master setting may be changed to cause a current flow rate to be calculated based on a number of counts from Hall effect device timer. For a given valve assembly/manifold outlet/flow channel/FHD corresponding to flow rate being detected, a corresponding required flow rate set in stage 330 and represented in the parameter register, may be referenced for comparison in stage 334. If a required flow rate and actual flow rate are not the same or differ by more than a preset deviation (e.g., within ±5%), the stepper motor for that valve assembly may be operated to correct the error.

At stage 344, the MCS processor can poll the various control input sources indirectly through MCS comms module. For some sources, such as the MCS user interface, the MCS processor can directly check for events that the MCS may respond to by modifying operations of one or more valve assemblies.

As noted above, the MCS processor can check certain settings, flags, or indicators on a preset or dynamically responsive incremental basis and change current operations based on the values of these elements which can change with the elapsing of time, number of operations performed, or reception of a new control input. In another example, the MCS processor can check a value of a user interface setting every 50 msec, which changes upon the reception of a command or instruction by the MCS user interface. This can include a user operating the MCS user interface to change a required flow rate, change another operating parameter (e.g., temperature, salinity, chlorination, turnover rate for water in a pool, etc.) that results in a change to a required flow rate, for a flow channel regulated by the manifold.

In one example, where the user interface setting is set to indicate a new command has been received, a display (e.g., an LCD) can be updated with required actions. An update to the display can also include displaying current actual flow rate values depending on a currently active screen on the display. In another example, if a control input according to certain communication protocol (e.g., RS485) has been received, the display may be updated with a new required flow rate value or any other update specified in the control input. In one example, MCS processor can perform the check in stage 344 every 50 msec.

The MCS processor may periodically transmit the actual flow rates, flag statuses, counter values, timer values, and other monitored signals or parameters to the parameter register in stage 346. The parameter register may execute an update function in stage 348 and change tracked parameter values using the information received in stage 346. Stage 346 may additionally include transmitting of the actual and required flow rates to the MCS user interface, which may display these values in stage 350.

At stage 350, the MCS user interface displays flow rates for valve assemblies based on various criteria that may be implemented by the MCS processor.

Table 1 included herein provides an example of a set of parameters that a VOC controller may utilize, reference, determine, update, or report in a process of implementing the example method of FIG. 3.

TABLE 1

Parameter Register

| Parameter | Description |
| --- | --- |
| Received Input | A 12-bytes register which is loaded as bytes are received from a UART. |
| Channel Status | Six 1-byte registers, each containing a current (actual) status of a channel (e.g., open or closed) for respective FHDs |
| Channel Received Status | Six 1-byte registers, each with a value for a channel as received from a control input source. |
| Channel Open Value | Six 2-byte registers, each containing a current flow count value that represents an open flow channel flow rate value for each channel. (Can be input via MCS user interface). |
| Channel Close Value | Six 2-byte registers, each containing a current flow count value that represents a closed flow channel flow rate value for each flow channel. (Can be input via MCS user interface). |
| Channel Actual Flow | Six 2-byte registers, each containing a 16 bit count captured by a timer measuring a flow rate for each flow channel regulated by a manifold. |
| Channel Required Flow | Six 2-byte registers, each containing a required flow rate for a given FHD that may specified during setup of a fluid distribution system, such as a pool, or at any other time. Value may be adjusted based on system changes that impact flow rate values (e.g., addition of new FHDs). |
| Channel Count | Six 1-byte counters, each specifying how many counts for a stepper motor to execute. |
| User Interface Count | 1-byte counter used to count to preset amount of time that when reached, a user interface setting may be changed and the counter may be reset to 0. |
| Input Received Setting | A 1-bit flag indicating that a valid 12 bytes message has been received and loaded in a Received Message Register. |
| Error Message Setting | A 1-byte flag for indicating an error is detected (e.g., No error detected, CRC error detected, byte value error in input) that may result a request by a routine to update. |
| Master Setting | A 1 bit flag set by a preset timer (e.g., 1 msec timer) and reset when this flag is processed (e.g., referenced for its status). |
| User Interface Setting | A 1 bit flag set when a timer reaches a preset amount of time (e.g., 50 msec) has elapsed since last being reset - may cause a user interface check to be executed. |

Figure 4:
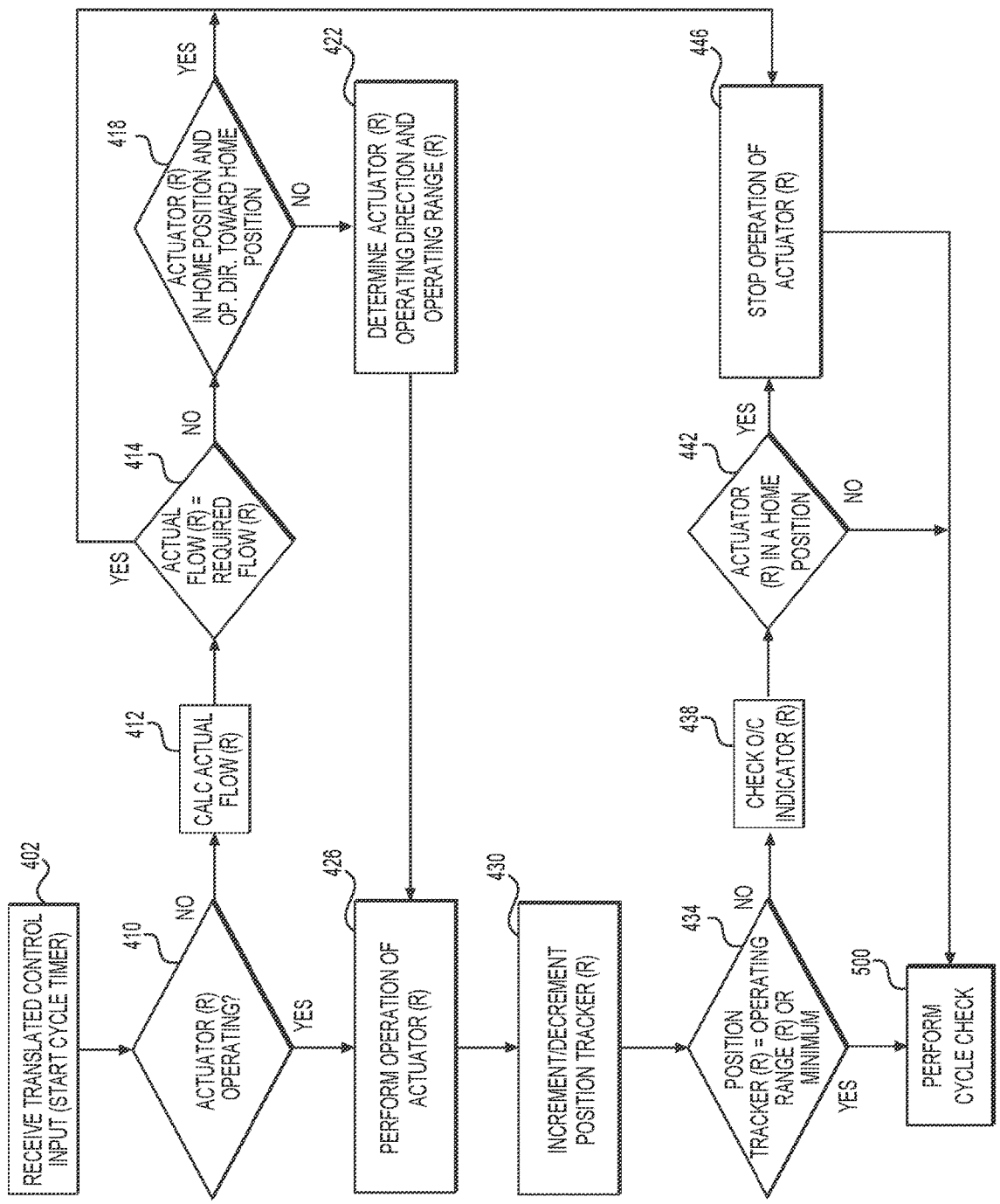
FIG. 4 illustrates an algorithmic flow chart of an example method for dynamically controlling valve assemblies of a fluid distribution manifold.

FIG. 4 illustrates an algorithmic flow chart of an example method for dynamically controlling flow rates from valve assemblies of a manifold.

At stage 402, a VOC controller can receive a translated control input. In one example, a cycle timer can be initiated when the translated control input is received. A valve assembly, or a flow channel, an outlet number, or an FHD can be identified from the control input in stage 402, which the VOC controller may recognize as corresponding to a particular valve assembly for which a flow rate must be changed or at least checked. As a result of this identification, an identifier ("R" in FIGS. 4 and 5) used to select which valve assembly to operate or check, can be set to a number or value associated with, or otherwise recognized by the VOC controller as belonging to, the valve assembly identified in the control input. In another example, this identifier may have a default value such that a process of checking and operating valve assemblies always begins with a check of one particular valve assembly, for example a bleed valve assembly as discussed with reference to FIG. 10.

In stage 410, the MCS processor and/or valve controller can determine if an actuator for a valve assembly regulating flow to specified FHD is currently performing an operation. In one example, a value for a flag, setting, or indicator can be set to one of two (or one of two of three values) when an actuator is operating to open or close the valve assembly, and the other of the two (or a third value) with the actuator in an idle or otherwise non-operational or non-moving state. Accordingly, if a value for this setting, flag, or indicator corresponds to a non-operational state, an actual flow rate from the valve assembly can be determined in stage 412.

Otherwise, a continued or next operation of whatever operation the actuator was performing will be implemented in stage 426.

In one example in which the actuator (R) includes a stepper motor, a step counter may be accessed in stage 410. If the step count is any number other than zero (0), a of the VOC controller (e.g., MCS processor, a valve controller (R), combination of the MCS processor and the valve controller (R)) may determine that the actuator is currently operating (e.g., causing a valve opening or closing movement). As a result, the exemplary method may include preforming an incremental operation of the actuator in stage 426, which is described in more detail below.

At stage 412, the VOC controller may determine an actual flow rate from a specified valve assembly according to any of the methods described herein. In stage 414, the actual flow rate for the valve assembly (R) may be compared to a required flow rate specified in, or otherwise derived from, the information provided in the control input. In one example, this may include determining whether or not the detected actual flow rate is within a standard deviation of a preset magnitude (e.g., 5%) of the required flow rate for the valve assembly (R). Upon determining that actual flow rate differs (in absolute terms or by more than a stand deviation) from the required flow rate, the VOC controller can perform a check of a position of a valve member (R) in stage 418.

In stage 418, the VOC controller may determine that the actuator (R) is in a home position. In one example, a home position may correspond to a fully open state of a valve assembly. Each valve assembly may be equipped with a position sensor that transmits an indication of an actuator or valve member position. A position may be registered when the actuator or valve member has been displaced a maximum possible amount in a valve opening direction.

In one example, each valve assembly may include a prime mover component (e.g., a shaft) that is moved by the operation of an actuator and a switch at the end of a movement path of that component. The component may contact the switch or cause the switch to be contact in such a manner as to open the switch if it closed or close it if it open, when the component reaches a maximum displacement in a valve opening movement along the component's movement path. Accordingly, the VOC controller can recognize a change to the switch as an indication that the valve assembly is in a fully open state and/or an actuator has reached the end of a valve opening operation.

In another example, a position sensor, such as a switch may be provided at an end of a movement path representing a fully closed state of the valve. In yet another example, position sensors (e.g., switches) may be provided at both ends of an actuator or valve member's movement path. In those configurations in which fully open and a fully closed home positions are recognized, and the actuator (R) or valve member (R) is determined to be in one of those home positions in stage 418, a direction for a next operation corresponding to the control input may be compared to the home position (i.e., a direction of movement for a next operation)

A potential operating direction of the valve member (R)/actuator (R) may be determined in stage 418 based on a sign of a differential between the actual and required flow rates. For example, where the actual flow rate (R) is greater than the required flow rate (R), a sign of this difference may be negative. The VOC controller may then recognize that the valve member (R) must move, or an actuator (R) must be operated, to cause a port regulated by the valve assembly (R) through which the detected fluid flows, to be closed (at least to some degree). The opposite being true for a differential having a positive value, meaning the valve assembly (R) needs to be opened more to provide the required flow rate. In the case where the actuator (R)/valve member (R) is in a fully open home position, and the operating direction is that of an opening direction, the VOC controller may determine that the valve assembly (R) cannot be operated in isolation to obtained the required flow rate (R).

In one example, a stepper motor may be utilized for at least one actuator in a manifold. A step count for this actuator may be set to preset value (e.g., 0) when a valve member is in a home position, or one of two home positions. In this example, a VOC controller can recognize this value for the step count as a stop condition and end the operation of the stepper motor actuator in stage 446 where the valve is in one of the home positions, and an operating direction specified in a control input is towards that home position.

In stage 422, where the actuator (R), or valve member (R), or a prime mover connecting them is (A) not in a home position, or (B) in a home position but an operating direction is not towards that home position, the VOC controller can determine an operating range for the actuator (R). Otherwise, where the actuator (R) is not in a home position, an operating direction and operating range may be determined in stage 422.

In one example, for an actuator including a stepper motor, the operating range may be a number of steps for a step counter of the actuator to reference. In this example, a step counter for the actuator (e.g., stepper motor) may be set to a standard (default) count value to generate a baseline number of steps. This number of steps for the stepper motor may correspond to a performance in stage 422 of an increment of stepper motor turns (e.g., 100 counts may generate 50 steps which result in a ¼ turn of the stepper motor). This may be the operation that occurs if the step count is not currently 0, in which case a step output pin for the stepper motor actuator may be toggled. In one example, this may cause the output pin to turn ON and OFF over a short increment of time (e.g., 1 msec) and create a standard step signal (e.g., a 500 Hz square wave step signal).

In stage 426, the VOC controller can perform an incremental operation of the actuator (R). In one example in which the actuator was already in operation, the operation in stage 426 is merely a continuation of a current process, or a predetermined next process, in the operation of the actuator (R). Otherwise, where a previous stage included stage 422, an operation of the actuator (R) can be started in stage 426.

As noted previously, in some examples an actuator for a valve assembly may include a stepper motor. In these examples, at stage 426, a step output pin for a stepper motor for an actuator may be toggled. In turn this may cause the step output pin to turn ON and OFF in 1 msec creating a 500 Hz square wave step signal. In one example, this toggling may be repeated every 1 msec until 50 steps (increment of operation) are completed. Instructions provided to a valve controller that may operate the actuator/stepper motor (on its own, or in tandem with a MCS processor, or as a subordinate to an MCS processor) may include, in stage 426, an enable signal, an indication of a clockwise or counter-clockwise direction for motor rotation, and a signal indicating an operating range (e.g., a step count). Where operations corresponding to stage 422 immediately precede those operations of stage 426, the enable signal may turn ON motor controller drivers to the stepper motor actuator. In other examples in which stage 426 is preceded by stage 410 or stage 422, an enable signal may correspond to a stay ON signal where a stepper motor must remain ON to maintain a current position. As previously noted, the operating range may include a number of steps for the stepper motor actuator to take.

Continuing with the above example, signals for enabling, an operating direction, and an operating range may be transmitted, received, and/or processed using general purpose Input/Output (GPIOs) of, for example, an MCS processor. In one example, a respective set of three signals may be recognized and associated with each flow channel and corresponding communication control channel for an FHD served by the flow channel. In anther example. Other control inputs for examples including stepper motor actuators may include inputs that are hardwired.

In the examples according to the present disclosure that include actuators that utilize stepper motors, design parameters for consideration in selecting a particular stepper motor may include Maximum linear displacement, Linear Displacement per revolution, and step size. In some examples, a max displacement of a stepper screw may be 30 mm, one revolution of the stepper may produced through 200 steps and moves the stepper screw 2 mm, and the stepper will move a ¼ turn, or 50 steps, as an initial default step size. Further specifications may including each step signal taking 1 msec to turn ON, and 1 msec to turn OFF so that a step frequency is 500 Hz or 2 msec per step (50% duty cycle).

At stage 430, a position tracker for the actuator (R) can be incremented. In one example this may correspond to incrementing a step count for an actuator including a stepper motor by one step count. In this example, the VOC controller may count up to the operating range (R). In another example, a step count may be decremented by one where MCS processor on valve controller counts down from a set range (R).

In stage 434, the VOC controller determines whether a value of the position tracker (R) indicates that the actuator (R) has been operated to the operating range. This is determined according to whether the position tracker (R) includes a step count that is incremented up to the operating range (R), or is decrement down to a minimum valve (e.g., zero (0)).

In one example in which the actuator (R) includes a stepper motor, the position tracker (R) may also encompass a status of a step output pin of the stepper motor. Accordingly, stage 434 can include, in addition to or as substitute for a comparison with the operating range, checking the step output pin for a low signal. This condition may correspond to a prime mover (e.g., a screw shaft) or a stepper motor of the actuator (R) having been operated (or moved) a predetermined amount.

If the operating range (R) criteria is not met, at stage 438, the valve controller or the MCS processor may access a fully open or closed status indicator (identified as "O/C indicator (R)" in FIG. 4 and referred to hereafter as "open/close indicator (R)") for the specified valve assembly to determine whether the valve member (R) is in a home position in stage 442. Accessing the open/close indicator (R) can include registering the operation of a switch position at the end or beginning of a movement path for the valve member (R) or prime mover (R) moved by the actuator (R).

In the exemplary method illustrated in FIG. 4, an operation of the actuator (R) will end where it is determined that an actual flow rate (R) is equal to the required flow rate (R) in stage 414, or the home position and operating direction criteria is met in stage 418, or it is determined that the actuator (R) is in a home position in stage 442.

Once the operation of the actuator (R) has been stopped in stage 446, or it is determined that the actuator is not in a home position in stage 442, or the operating range (R) criteria is of stage 434 is met, the MCS processor may perform a cycle check in stage 500. As will be explained with reference to FIG. 5, the cycle check may include checking a status of all valve assembly operations, checking for new control inputs, and, in some examples, current and required flow rates for each of the FHD served by the valve assemblies of an exemplary manifold according to the present disclosure.

Figure 5:
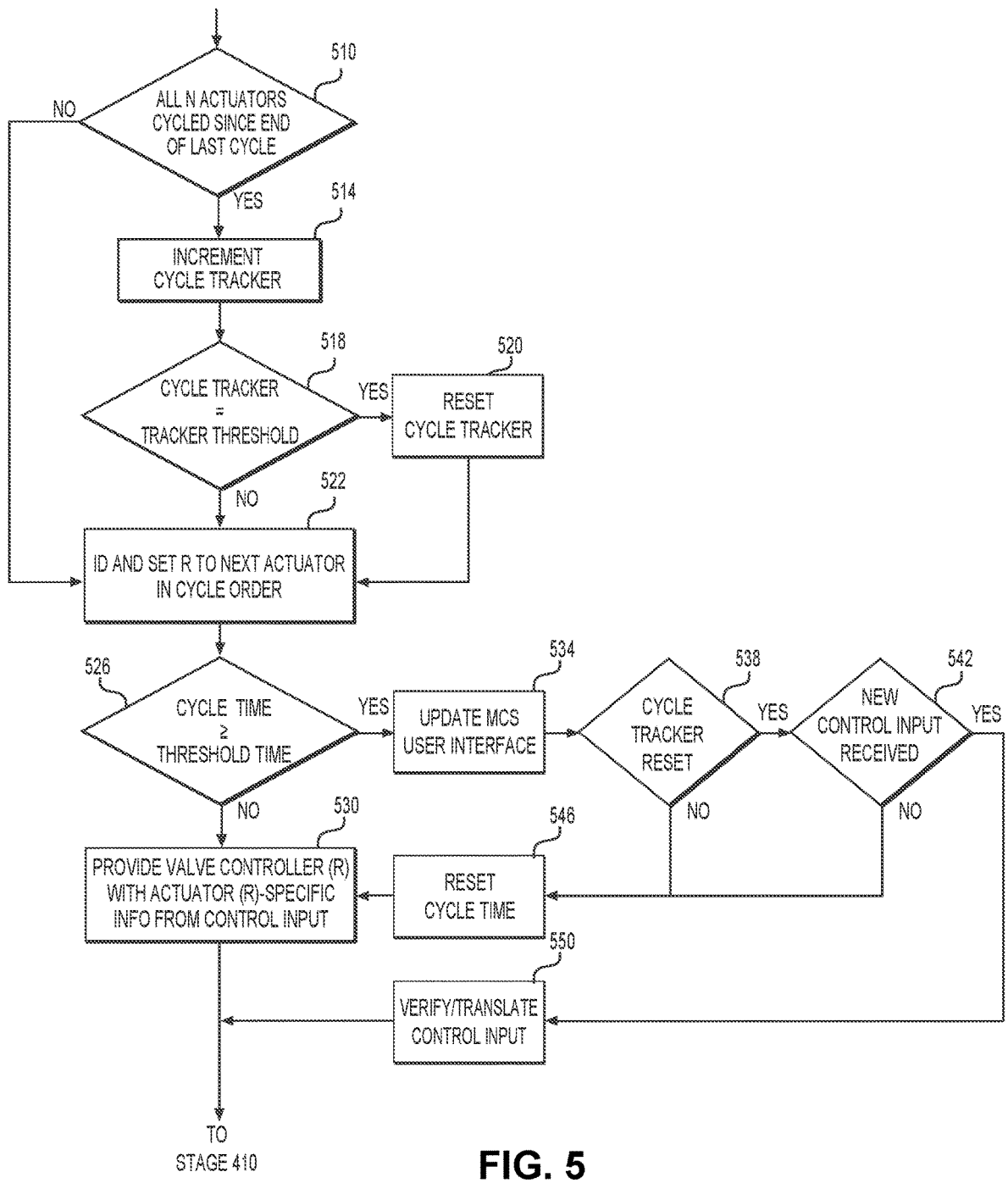
FIG. 5 illustrates an algorithmic flow chart for performing a cycle and control input check.

FIG. 5 illustrates an algorithmic flow chart for performing a cycle and control input check.

At stage 510, a VOC controller determine may that all the actuators have not been cycled through and identify a next actuator in the cycle to be operated in stage 522. An order for a cycle of operating all the actuators may be preset, or recorded in the parameter register and updated depending on operating conditions. In another example, the order can be: consecutive from a valve assembly requiring operation; specified based on an ordering criteria that depends on which of the valve assemblies has to be operated first; based on a difference between actual and required flow rates; based on a position of a valve assembly for a specified FHD within the manifold relative to a position of a compensating valve assembly; or other criteria.

Alternatively, the VOC controller may determine that all the valve assemblies have been cycled through and increment a cycle tracker in stage 514. In one example, the cycle tracker may correspond to a setting, flag, count, or indicator that the VOC controller uses as a reference to track operations, or series of operations that have been preformed. In stage 518, the VOC controller may compare the cycle tracker value to a tracker threshold value. Where the cycle tracker is less than the tracker threshold, the VOC controller may identify a next actuator in a cycle order and set R to an identifier for that actuator. On the other hand, the cycle tracker will be reset to an initial value in stage 520 if it is equal to the tracker threshold.

In one example, the tracker threshold value may correspond to a total number of valve assemblies in a manifold. Accordingly, when a cycle tracker reaches the tracker threshold, the VOC controller can recognize that all of the valve assemblies have been checked and operated as part of a current cycle since the last time a cycle tracker was reset. Thus, for a manifold with N number of valves, the tracker threshold may be set to the value of N. Thus, when the cycle tracker reaches a value of N after being incremented in stage 514, the VOC controller will be able to in effect know that all valve assemblies have been checked and/or operated as part of current cycle with the evaluation performed in stage 518. In this situation, the cycle tracker will be reset in stage 520.

At stage 522, the current value of the cycle tracker can be used to determine which of the actuators will be the next for operation. In one example, a reset cycle tracker may cause the VOC controller to look to the beginning of a cycle order for a next actuator to operate because a new cycle will be started. On the other hand, the cycle tracker having a non-reset value will indicate to the VOC controller that the next actuator to operator is the next actuator of the cycle order.

In stage 526, the VOC controller can determine if a cycle time is equal to or has extended past a threshold time that is used to trigger a start of a new repetition of operations. In one example, the preset amount of time set for the threshold time may be 50 msec. Where the threshold amount of time has not elapsed since the last instance a cycle time was reset, the VOC controller may access or reference back to the last control input received. In addition, operational information (e.g., required flow rate) specified for an actuator corresponding a current R value may be pulled from the control input in stage 530 and implemented by the VOC controller in stage 410.

On the other hand, where the cycle time is equal to or greater than the threshold time, the VOC controller can update an MCS user interface in stage 534. In one example, a value for the threshold time may be based on or set in accordance with a routine for checking if any new control inputs have been received from a user through an MCS user interface. For example, with every increment of time equal to the threshold amount of time that elapses (e.g., 50 msec) a user interface flag can be set which causes a display of the user interface to be updated with the latest flow rate values.

At stage 538, the VOC controller may check to see if the cycle tracker was reset as result of a most recent check of the cycle tracker in stage 518. If it has not been reset, the VOC controller can make a check for whether any new control input has been received in stage 542. Otherwise, if the cycle tracker has not been reset, or has been reset but a new control input has not been received, the VOC controller can reset the cycle time in stage 546. Further, the VOC controller can access the most recent translated control input for actuator specific operational information in stage 530. But, where a new control input has been received, the VOC controller can verify the new control input in stage 550, which can then be implemented, if verified, starting with the operations for stage 410.

Figure 6:
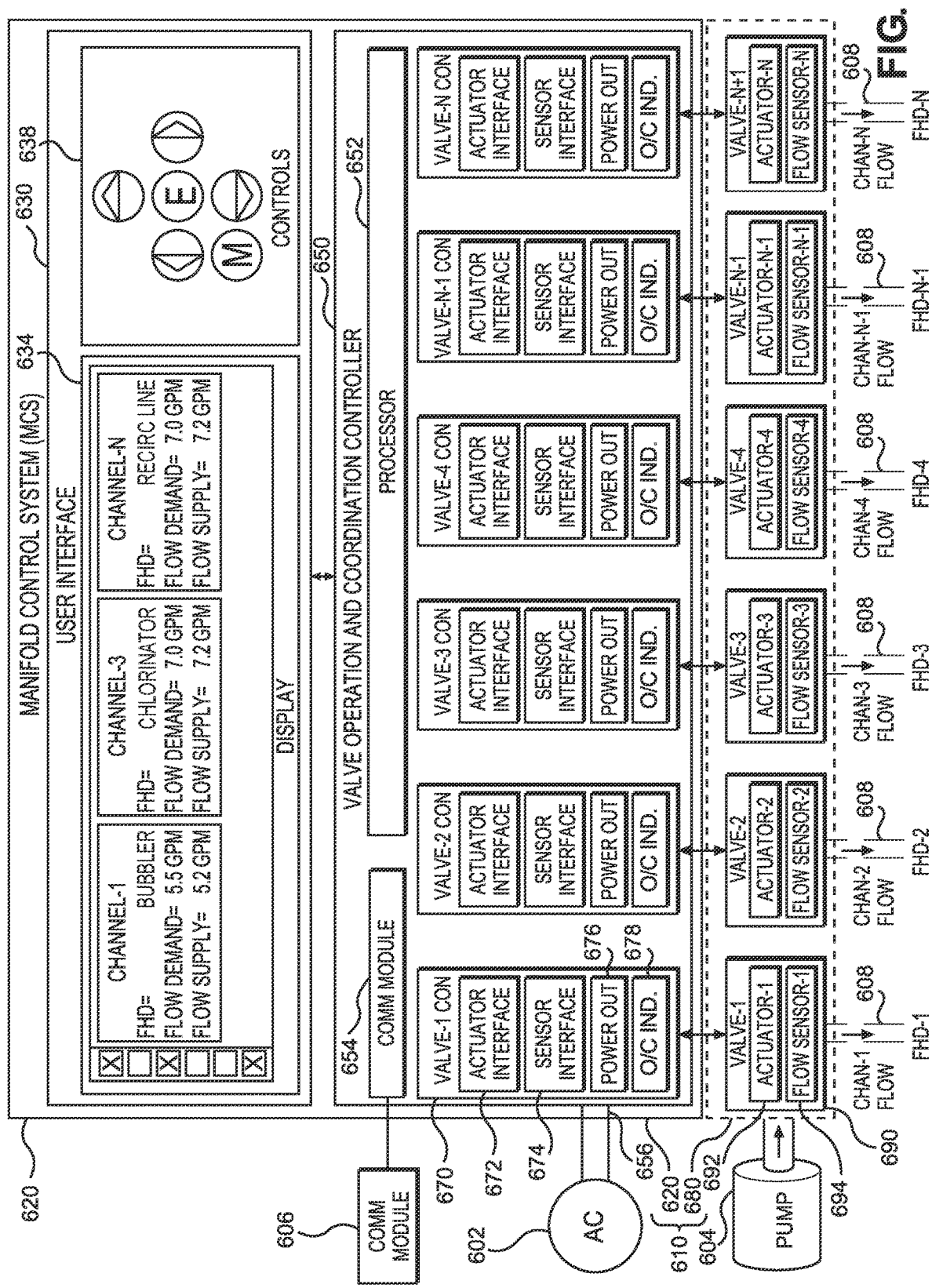
FIG. 6 illustrates a schematic view of a manifold control system and a fluid distribution manifold of a fluid handling system, according to an aspect of the present disclosure.

FIG. 6 illustrates a schematic view of a manifold control system 620 ("MCS 620") of a manifold 610 provided in a fluid system 600, according to an aspect of the present disclosure. The manifold 610 includes the MCS 620 and a chamber 680. The MCS 620 includes a user interface 630 and a valve operation and coordination controller 650 ("VOC controller 650").

The user interface 630 is provided with a display 634 and a set of controls 638. For the display 634, the user interface 630 may include a liquid crystal display ("LCD") that provides a graphical interface, and a bus (e.g., I2C or SPI bus) connection to a processor. The controls 638 may include push-buttons, for example six push buttons, and associated de-bounce hardware. The user interface 630 may communicate (via, e.g., a processor for the user interface) with the VOC controller 650 to convey control inputs from the controls 638 and send and receive information.

In one example, the VOC controller 650 includes at least one processor 652, a first comms module 654, a power input 656, and at least one valve controller 670. It is through the first comms module 654 that the VOC controller 650 receives control inputs that the VOC controller 650 processes to determine and implement operations of valve assemblies 690 installed in a chamber 680 of the manifold 610. As shown, the power input 656 may be connected to a power source 602, the chamber 680 may be in fluid communication with a pump 604, and a second comms module 606 may communicate with the first comms module 654. The control inputs received through the first comms module 654 are used by the VOC controller 650 to dynamically control: (A) flow rate to each of a plurality of flow channels 608; and (B) a total flow rate of fluid to a combination of all the flow channels 608.

In general, the VOC controller 650 will be equipped with processing power required to control the manifold 610. In a specific example, the VOC controller 650 may include a microchip ARM M0+ processor (e.g., an ATSAMC20) that is selected based on a number of different parameters including memory size (flash/RAM), timer support capabilities, actuator interface compatibility, number of general purpose Input/Outputs ("GPIOs"), low voltage operating capabilities, and other factors.

The first comms module 654 may be configured to communicate directly with a PSC panel, (not shown) the fluid handling system 600, or through the second comms module 606. In another example, either of the first or second comms modules 654, 606 can be connected to an external control device (not shown), such as an external controller or a peripheral device (e.g., a phone, laptop, tablet, personal computer, a controller for an FHD, etc.) that serves as an intermediary between the MCS 620 and a PSC panel. In another example, the first comms module 654 can communicate directly, or through the second comms module 606 with both of a PSC panel and an external control device.

As illustrated in FIG. 6, a valve controller 670 is provided for, and may be included as a part of, each of the valve assemblies 690. In other examples described herein, a single valve controller 670 can be provided, or more generally, less valve controllers than a number of valve assemblies 690 may be provided. Each of the valve controllers 670 can include an actuator interface 672 for communicating and/or directing operations of an actuator 692, a sensor interface 674 for processing flow information from a flow sensor 694, a power output 676, and a valve full-open, or full close, or full-open and full-close indicator 678 (identified as "O/C IND." in FIG. 6 and hereafter referred to as "open/close indicator 678").

Each actuator interface 672 can provide a line of communication between a respective actuator 692 and either the processor 652 or a separate control manager (not shown) for a respective valve controller 670. In one example, the actuator interface 672 can perform one or more processes to determine an instruction which it transmits to a respective actuator 692 and causes the actuator 692 to perform and operation specified in the instruction. In another example, an instruction can be generated at the level of the processor 652, and the actuator interface 672 serves merely as a communication channel between the processor 652 and a respective actuator 692. Each actuator 692 may be directly controlled by a dedicated actuator interface 672 and reduce a processing burden on the processor 652.

In one example, stepper motors may be provided for the actuators 692, actuator interfaces 672 may include an integrated stepper motor controllers (e.g., a DRV8834, or the like) configured to issue enable, step, and direction signals to one or more stepper motors. In this example, the stepper motor controllers may be equipped with special hardware and have special hardware requirements for setup such that some operations may hardwired on a printed circuit board ("PCB"). Such a PCB may be incorporated in the VOC controller 670.

A sensor interface 674, in one example, can process information from a respective flow sensor 694 (e.g., a signal, a series of signals, a message, flag status, value of a measured parameter) for: display; translation and display; additional processing, translation, and display; or verification and display. In one example, the sensor interface 674 may provide a communication path between a respective flow sensor 694 and the processor 652, and the processor 652 may determine a flow rate from the information provided by the actuator interface 672 which is based on the information received from the respective flow sensor 694.

Figure 8:
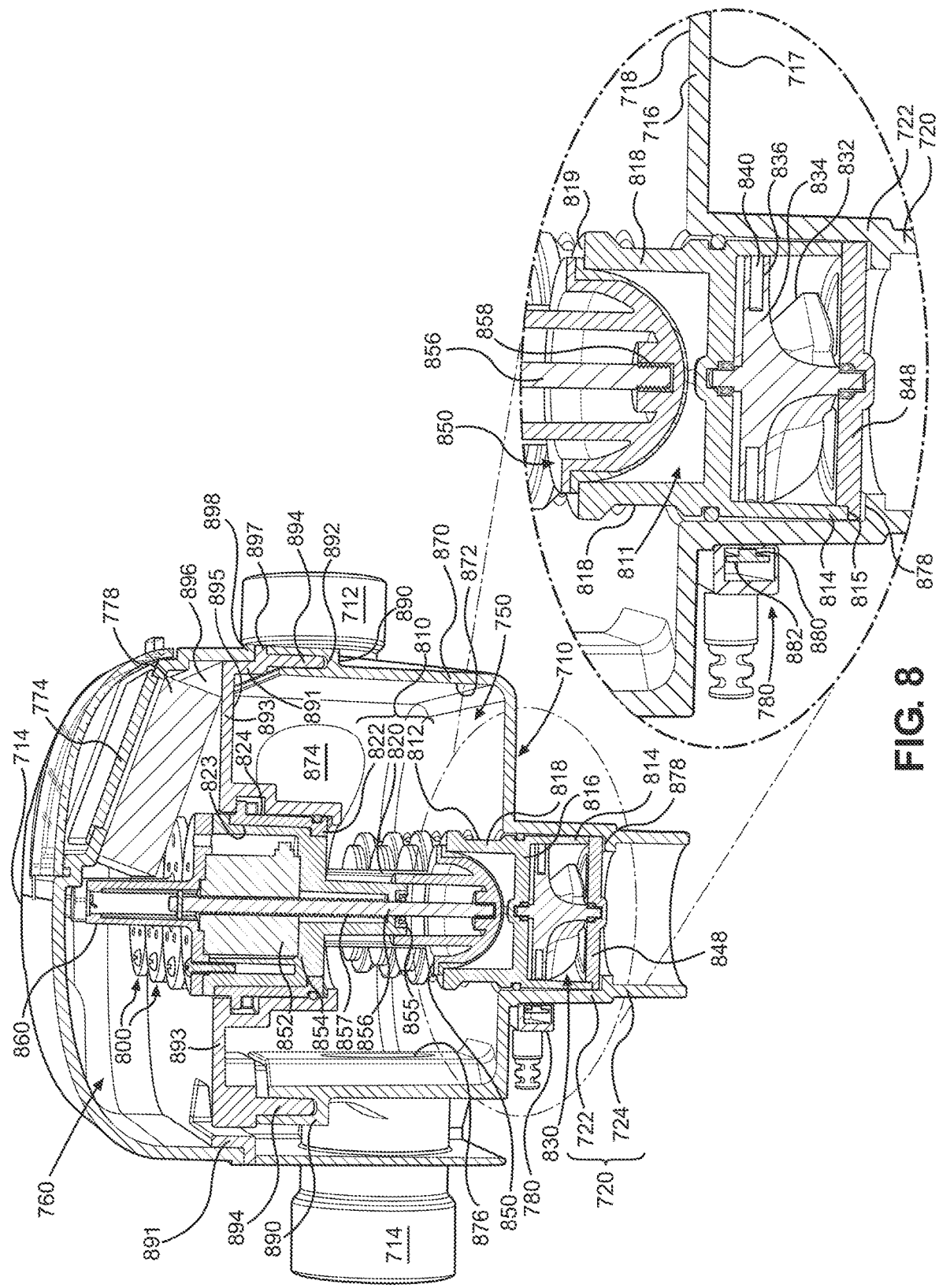
FIG. 8 is a sectional view of the fluid distribution manifold of FIG. 7 taken from a plane indicated by line 8-8.

In another example, the sensor interface 674 may primarily, or additionally, provide a first flow monitoring component, as incorporated in the exemplary manifold 800 of FIG. 8. Accordingly, the sensor interface 674 may include a Hall effect device communicatively attached to a flow measuring device, such as magnet equipped impeller. In addition, the sensor interface 674 may include hardware that interfaces these Hall effect signals to a respective valve controller 670 and/or the processor 654. The flow measuring device mentioned above may encompass primarily, or in part, a flow sensor 694, and be provided inside an outlet port of a manifold. With the outlet port being in fluid communication with a flow channel, the flow sensor 694 may generate two pulses per rotation of the impeller of the flow sensor 694 and thereby provide data that can be used to determine and indicate a flow rate of fluid passing through the outlet port.

A power output 676 for each valve controller 670 may be connected, and supply power to a respective valve assembly 690 and its actuator 692 and flow sensor 694. Each of the power outputs 676 can draw from a connection to a power supply provided by the power input 656 for the MCS 620. In one example, the power input 656 may provide a 24 VAC supply that will be utilized to provide all the power requirements for the manifold 610. Hardware incorporated in the manifold 610 and represented by the power outputs 676 may handle/require/output 5V signals and manage power requirements for all devices including the valve controllers 670, the actuator interfaces 672, and the actuators 692.

Each power output 676 can carry a 5V signal or other voltage power signal to a respective valve assembly 690. Accordingly, all valves assemblies 690 provided in the chamber 680 can be powered through the connection between power input 656 for the MCS 620 and the power source 606 connected thereto.

As previously noted, each valve controller 670 includes a full-open/full-close indicator that may be configured to detect or otherwise operate as a way of indicating that an actuator 692 (or valve member) is located in a home position and a respective valve assembly 690 is in a fully open or fully closed state. For example, each valve controller 670 may include a home momentary contact switch that can be used to define, to either a respective valve controller 670 or the processor 654, a fully open position for a respective valve assembly 690, and can be considered as a limit switch for an open flow channel.

During an initial setup, an actuator 694 may operate a valve assembly 690 to open a respective fluid flow channel until a respective open/close indicator 678 registers a position of a valve member and, in this example, an open state of a flow channel. In a particular example where a stepper motor is provided as an actuator 694, a stepper motor controller may open a respective flow channel until a home switch provided as an open/close indicator 678 closes, and thereby indicates a maximum open travel of a valve member has been hit. This method of open (or closed) detection can be utilized to cause a valve assembly to be in a fully open state during setup. During normal manifold operations, this functionality may be used as a diagnostic tool to indicate a possible error in a position of a valve member.

As described herein, a home position may correspond to a position of an actuator and valve member that corresponding a fully open or a fully closed state for a valve assembly 690. In one example, each open/close indicator 678 may be monitored by a respective valve controller 670, and/or by the processor 654. Recognition of these operational conditions (fully open or fully closed) can be used as a way to determine that: (1) other valve assemblies may have to be operated to achieve a desired flow rate through a particular valve assembly that is fully open; or (2) other valve assemblies may have to be operated to achieve a desire flow rate through a select valve assembly since the fully closed valve assembly cannot further having an increasing affect to the flow rate of fluid entering another valve assembly in a manifold.

FIGS. 7A and 7B illustrate perspective views of a fluid distribution manifold 700 ("manifold 700"), according to an aspect of the present disclosure. The manifold 700 includes a first housing 710, a valve retainer 730, and a second housing 740. Together the first housing 710 and the valve retainer 730 define a first chamber 750, and the second housing 740 and the valve retainer 730 define a second chamber 760, both of which are identified in FIG. 8. In one example, the first housing 710 includes a body that defines at least two inlets 712, at least one pressure relief outlet 714, and a plurality of outlets 720.

Each of the outlets 720 may extend from a portion of an external surface 717 of a lower wall 716 of the first housing 710 that surrounds an aperture (not visible) formed in the lower wall 716. The apertures defining outlet ports extend through an inner surface of the lower wall 716 to be able to receive valve assemblies 800. As shown in FIGS. 7A and 7B, each outlet 720 may include a stepped profile with a distal end 724 having a smaller diameter than a proximal end 722 that extends from the lower wall 716. An inner surface of the proximal end 722 may correspond to an outer surface of a valve housing so that portion of the valve housing of a valve assembly 800 can extend through the lower wall 716 and be received in the proximal end 722 of the outlet 720. In one example, the first housing 710 may include at least six (6) outlets 720, with a valve assembly 800 respectively received in a proximal end 722 of each outlet 720 to control a flow of fluid through a corresponding distal end 724 of the outlet 720.

In other examples, a slot corresponding to each outlet 720 may extend into the first housing 710 from an internal surface of the lower wall 716. The first housing 710 may include at least six (6) slot and outlet 720 combinations, with a valve assembly 800 received in each slot to control a flow of fluid through a corresponding outlet 720.

The second housing 740 may house components of a manifold control system 770 ("MCS 770") and a valve cover 860 for each of the valve assemblies 800. Various components of the MCS 770 may be integrated into or otherwise be attached the second housing 740. Exemplary manifold control systems are described herein, but generally are configured to operate or otherwise include a user interface 772. As shown the user interface 772 of the MCS 770 can include a display 774 and controls 776 such as an exemplary display 634 and user interface 638 illustrated in FIG. 6.

In one example, the second housing 740 is sealed from the first housing 710 by the valve retainer 730 and valve covers 860 and housings of the valve assemblies 800. Thus, within the second housing 740, components of the MCS 770 are not exposed to fluid flowing through the first housing 710 from the inlets 712. In particular, an MCS processor 778, or a component serving as a VOC controller that includes the MCS processor and valve controllers (both installed in the valves housings and/or in the second housing 740), are exposed to the fluid flowing through the first housing 710.

Such an MCS, as previously described, may be configured to operate the display 774 and receive various input commands that are received by the controls 776 of the user interface 772. The display 774 and the controls 776 may be installed in the second housing 740. In various examples, the user interface 772 includes physical buttons, or is provided by a touch screen defined or otherwise provided by the display 774, or is comprised of a combination of physical buttons and touch screen functionality.

A sensor assembly 780 for determining flow rates of fluid through the outlets 720 may be attached to the first housing 710 proximate to the outlets 720. Each valve assembly 800 may be equipped with a second flow monitoring component 840 (see FIGS. 8 and 9) that is paired with a first flow monitoring component 880 (see FIGS. 8 and 9) provided by the sensor assembly 780. According to aspects of the present disclosure, operational control of each valve assembly 800 in the manifold 700 will depend from: (1) an input fluid flow rate to the inlets 712 of the manifold 700; (2) a flow rate through a flow channel required by an FHD served by that flow channel and regulated by a respective valve assembly 800; and (3) a total output flow rate required by all flow channels regulated by the manifold 700. The first flow monitoring components 880, and in some examples the second flow monitoring components 840, may communicate with the MCS 770 to enable independent operational control of each valve assembly 800 for achieving required channel output flow rates and a required total output flow rate as previously described herein.

Figure 7:
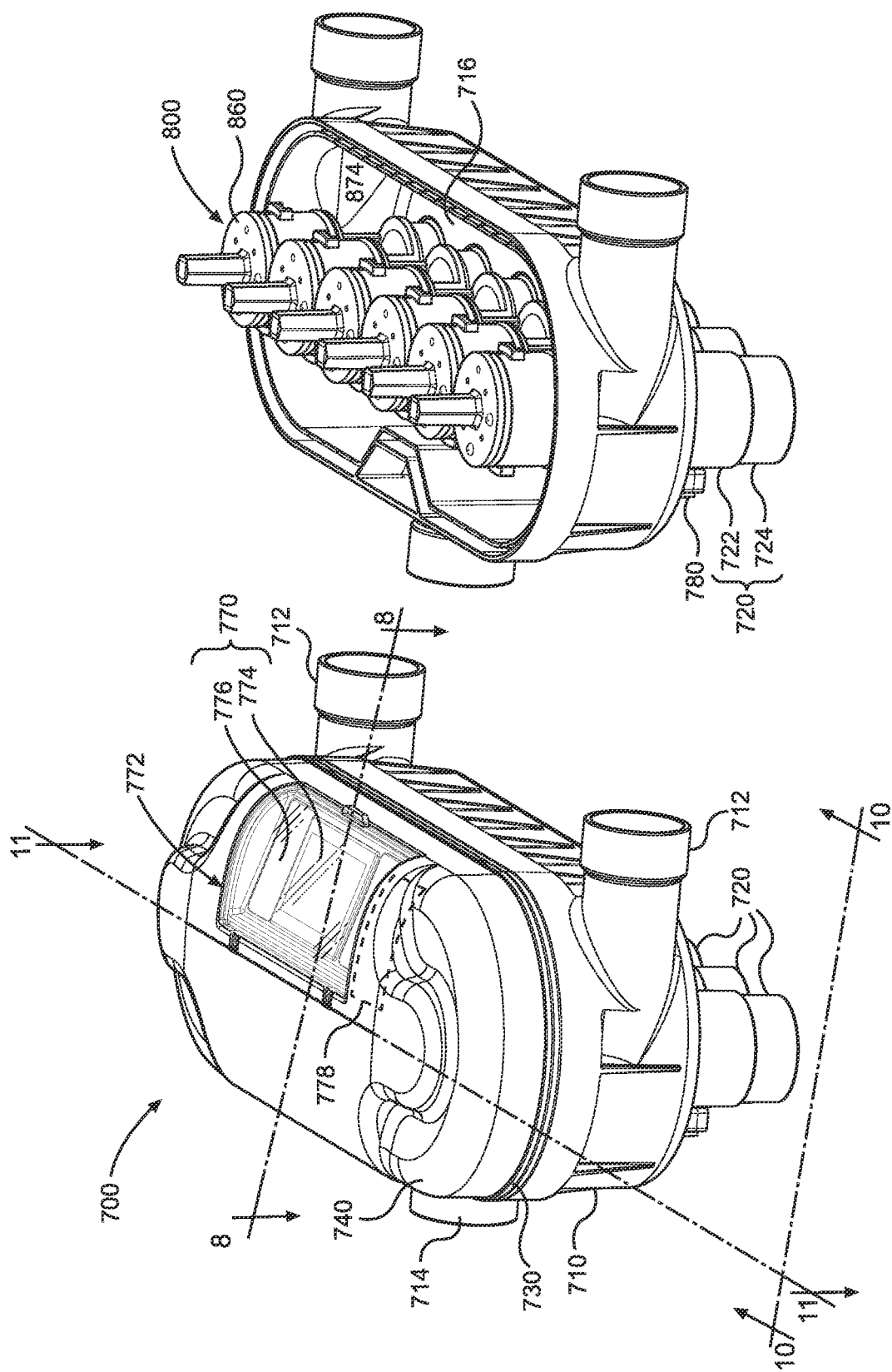
FIGS. 7A and 7B illustrate perspective views of a fluid distribution manifold, according to an aspect of the present disclosure.

FIG. 8 is a sectional view of the fluid distribution manifold taken from a plane indicated by line 8-8 as illustrated in FIG. 7.

As shown, the first housing 710 includes a first rim 890 provided with a groove 892 configured to receive a protruding edge 894 of the valve retainer 730. As shown, the protruding edge 894 extends downward from a flanged lip 897, which extends outwardly from a side wall 891 of the valve retainer 730. As also shown in FIG. 8, the sidewall 891 extends downward from a retention plate 893 that is defined by a first surface 895 and a second surface 896 of the valve retainer 730. In one example, the protruding edge 894 can be friction fitted to the groove 892. In another example, a snap fit can be provided with corresponding engagement features provided on the outer and inner surfaces that respectively define the protruding edge 894 and the groove 892. In still another example, the protruding edge 894 or the groove 892 may be formed with a recessed groove for receiving an O-ring configured to secure the protruding edge 894 in the groove 892 of the rim 890. As assembled, the first surface 895 of the valve retainer 730 and an inner surface 872 of the first housing 710 define the first chamber 750 in which the valve assemblies 800 are primarily positioned.

Referring back to FIGS. 7A and 7B, the first housing 710 includes the two inlets 712, the pressure relief outlet 714, and the plurality of outlets 720. As shown in FIG. 8, surrounding wall 870 defines inlet ports 874 and a pressure relief port 876 within the first housing 710, and from which the inlet ports 874 and the pressure relief port 876 extend respectively. The inlet ports 874 are provided on opposite ends of the first housing 710 so that a flow rate of fluid flowing in the first chamber 750 and around the valve assemblies 800 is substantially uniform. Although the inlets and corresponding inlet ports 874 could be provided in multiple numbers and locations, the configuration illustrated provides advantages over configurations that include one inlet on just one end, or in a middle portion of the first housing. In these configurations, an incoming flow rate may be lower for fluid flowing to valve assemblies 800 located within the manifold 700 further from the inlet than flow rates for assemblies located closer to the inlets. The duel inlet ports 874 of the exemplary manifold 700 illustrated in FIGS. 7B and 8, convey fluid into to the first chamber 750 from opposite ends of the first housing 710 to reduce the opportunity for non-uniform flow rates.

In one example, each valve assembly 800 can include a valve housing 810 having a first mating structure 812 extending from two or more wall segments 820 that extend from a second mating structure 822. In the example illustrated in FIG. 8, the valve housing 810 has an overall cylindrical shape, but one of ordinary skill in the art will recognize that other configurations can be used.

The first mating structure 812 includes a first end 814 that is sized so as to fit within a proximal end 722 of an outlet 720 provided by the first housing 710. The first end 814 of the first mating structure 812 may define a first end face 815 that is shown in a closeup of FIG. 8. The first end face 815 may engage an end piece 848 of the valve assembly 800 that secures an impeller 830 within the first end 814. The first end 814 and first end face 815 may be sized to directly or indirectly engage, rest on, or otherwise be prevented from moving beyond a ridge 878 formed on an inner surface of the outlet 720 at a step defined by a transition from the proximal end 722 to the distal end 724 of the outlet 720.

An impeller 830 is positioned within the first end 814 of the first mating structure 812 and carries one or more magnets 840 within individual blades 832 of the impeller 830. Each blade includes a base portion 834, and at least two or more base portions may be formed with bores 836 configured to receive magnets 840. In one example, the magnets 840 are positioned within base portions 832 that are diametrically opposed relative to a longitudinal axis of the impeller 830.

The magnets 840 provide a second flow monitoring component configured to be paired with a corresponding first monitoring component 880 provided in the sensor assembly 780 as shown in the close up of FIG. 8. In one example, the first flow monitoring component 880 includes a Hall effect device that is fixed to a strip or elongated terminal 882 configured to operate as a bus (hereafter referred to as "bus 882"). The bus 882 is configured to transmit signals generated by the first flow monitoring components 880 to the MCS 770, or any type of MCS described herein. As fluid flows through the first end 814 of the valve assembly 800, the impeller 830 is caused to rotate at a speed that may be proportional to a flow rate of the fluid flow through the first mating structure 812 and out of the outlet 720. As will be explained with reference to FIG. 9, rotation of the impeller 830 may be detected by the first flow monitoring component 880 as it registers the rotational movement of the magnets 840.

A second end 818 of the first mating structure 812 is separated from the first end 814 by a partition 816 as shown in FIG. 8. An outer circumference of the first mating structure 812 may be formed with a recessed groove 817 as shown in the close-up of FIG. 8, and used to receive an O-ring that helps secure the valve housing 810 within the proximal end 722 of the outlet 720. In another example, instead of, or in addition to the O-ring, the first end 814 of the first mating structure 812 can be sized to be press-fit to an inner surface of the proximal end of the outlet 720.

Above the partition 816 and the recessed groove 817, the second end 818 of the first mating structure 812 defines a bore or other shaped area that may receive a valve member 850 of the valve assembly 800. The second end 818 of the first mating structure 812 defines a second end face 819 configured to provide a valve seat (hereafter "second end face 819" or "valve seat 819") for engaging valve members 850 (e.g., a plunger) of the valve assemblies 800. During a valve closing operation, an actuator 852 of the valve assembly may be operated to bring a surface of the valve member 850 into abutment with the second end face 819 and provide a tight seal. As a result of this operation, fluid flowing within the first chamber will not enter the second end 818, and therefore not flow through the partition 816, past the impeller 830, and out of the distal end of the outlet 720.

Turning to the second mating structure 822 of the valve housing 810, this portion of the valve assembly 800 is configured to slide in and be locked to a slot 1130 (see FIGS. 11-12C, 14A, and 14B) of the valve retainer 730. An outer surface 824 of the second mating structure 822 may be provided with engagement members 1110 (see FIGS. 11 and 13A-D) to facilitate an interlocking engagement with the slot 1130 that is described in more detail with reference to FIGS. 12A to 15. An inner surface 823 of the second mating structure 822, on the other hand, may be specifically configured to receive and secure an actuator housing 854 of an actuator sub-assembly of the valve assembly 800.

The actuator sub-assembly includes the actuator housing 854 that is configured to receive an actuator 852, which is operatively coupled to a prime mover 856 configured to engage the valve member 850. In one example, the actuator 852 may include a stepper motor having a stator and rotor, and the prime mover 856 may include a threaded main shaft 857 that is caused to move in a linear manner by rotation of the rotor of the stepper motor. The prime mover 856, as shown, may include a threaded end 858 that can be use to securely attach the valve member 850 to the prime mover 856. The actuator housing 854 may include a bearing 855 to assist the linear movement of the prime mover 856.

Upward movement of the prime mover 856 will likewise cause an upward movement of the valve member 850 away from the valve seat 819 defined by the first mating structure 812. However, as with the valve assembly 800 illustrated in FIG. 8, the valve member 850 may be shaped so that moving away from the valve seat 819 gradually lessens by how much a fluid port defined by the second end 818 is obstructed by a body of the valve member 850. A flow rate of fluid entering the second end 818 of the first mating structure 812, and thus exiting through the outlet 720, increases or decreases in proportion to a degree to which the valve member 850 obstructs an opening to the fluid chamber 811 defined by the second end 818. In the exemplary case shown, with the actuator 852 provided by a stepper motor, the actuator can controllably move the prime mover 856, and thus the valve member 850, in extremely small and precise increments. As a result, a degree to which the second end is obstructed by the valve member 850, and flow rate of fluid through the outlet 720, can be controlled to a very precise degree by the MCS 770, which may include all the capabilities of any exemplary MCS described herein, such as the MCS 600 shown in FIG. 6.

The MCS 770 dynamically controls the flow rate of fluid through the outlets 720 by operating the valve assemblies 800. Further, the MCS 770 is positioned, at least in part, within a second chamber 760 defined by the valve retainer 730 and the second housing 740. The second housing 740 includes a second rim 898 that corresponds to the flanged lip 897 that extends outwardly from the sidewall 891, which itself extends downwardly from the retention plate 893 of the valve retainer 730. In one example, the second rim 898 can be configured to be snap fit to the flanged lip 897. More specifically, one of the valve retainer 730 or the second housing 740 can be formed with prongs that can releasably snap into slots or recesses formed in the other of these two components.

As assembled, the second surface 896 of the retention plate 893 of the valve retainer 730, and an inner surface 899 of the second housing 740 define the second chamber 760 as previously mentioned. The second chamber 760 houses many of the components that make up the MCS 770 and a valve cover 860 of each valve assembly 800. In one example, a shape of the second housing 740 may be formed in such a way to accommodate one or more components of the MCS 770 or the valve assemblies 800. In one example, the second housing 740 may be provided in a shape having a sufficient height to accommodate a full range of motion of a prime mover 856 of an actuator 852.

Figure 9:
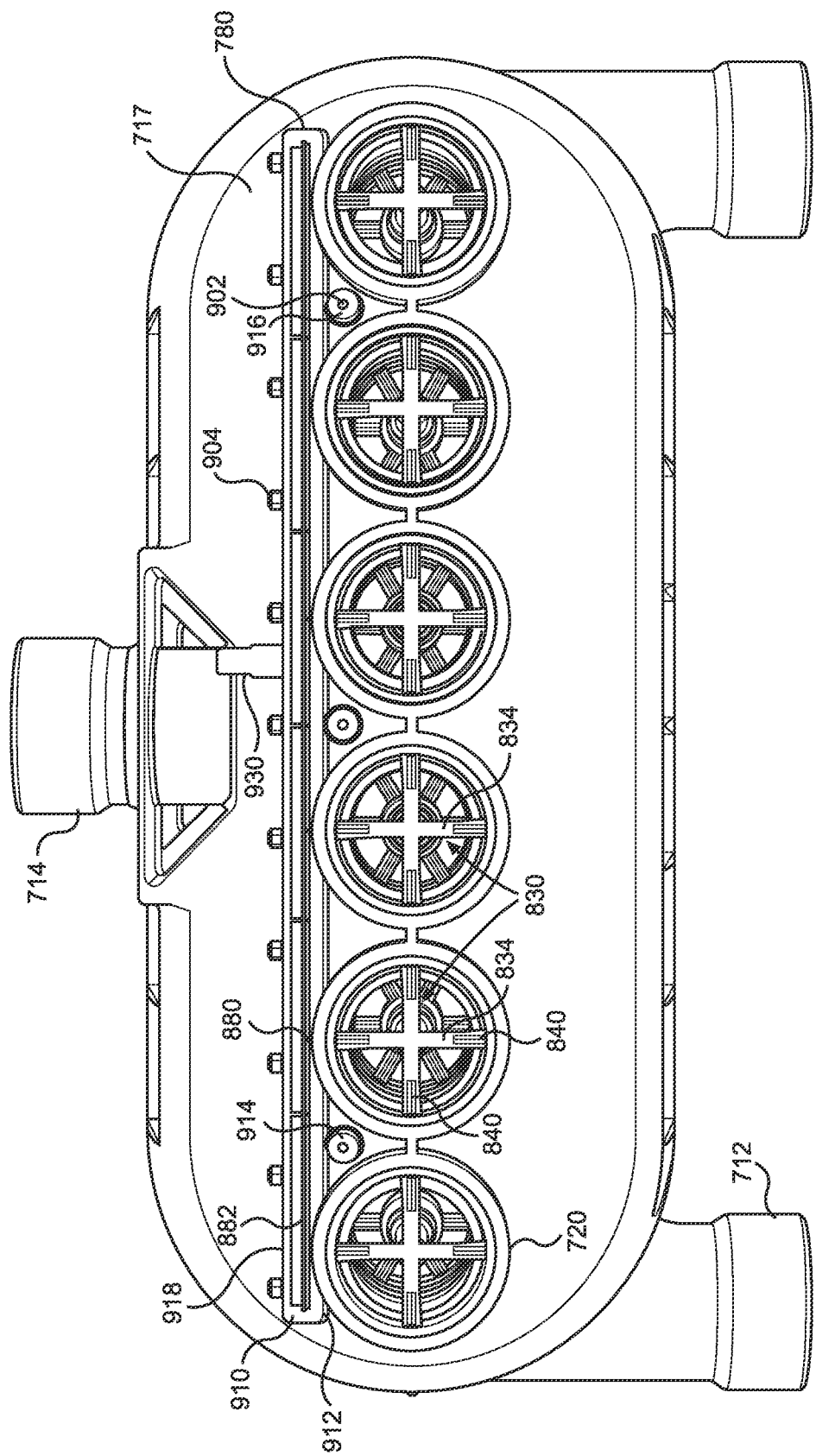
FIG. 9 is a sectional view of the fluid distribution manifold of FIG. 7 taken from a plane indicated by line 9-9.

FIG. 9 is a sectional view of the fluid distribution manifold 700 taken from a plane indicated by line 9-9 in FIG. 7A. More specifically, FIG. 9 shows an elevation view of a bottom side of the pressure relief outlet 714, the inlets 812, and an outer surface of the lower wall 716 of the first housing 710, as well as a cross-sectional view of the sensor assembly 780, each outlet 720, and a base portion 834 of each impeller 830.

The sensor assembly 780 includes a sensor housing 910 that is fastened to the first housing 710 with fasteners 902 (e.g., screws, removable pins, etc.). These fasteners 902 may be received in first bores 916 formed in protrusions 914 that extend from a first side 912 of the sensor housing 910. The first bores 916 may correspond to second bores (not shown) formed in the lower wall 716 of the first housing 710. The sensor housing 910 is sized such that a width between the first side 912 and a second side 918 of the sensor housing 910 corresponds to a space between outer surfaces of the proximal ends 722 of the outlets 720 and guide prongs 904 that extend from the outer surface 717 of the lower wall 716. With the guide prongs 904, installation and removal of the sensor assembly 780 can easily be accomplished by, for example, field personnel servicing the manifold 700 and other components of a fluid distribution system, such as a pool system.

The sensor assembly 780 includes the sensor housing 910, the bus 882 that extends over a length of the sensor housing 910, and second flow monitoring components 840 attached to the bus 882 for each outlet 720. In one example, each first flow monitoring component 880 can includes a Hall effect device (e.g., a Hall sensor) that detects the movement of magnets 840 in a base portion 834 of an impeller 830 positioned in an outlet 720 adjacently located to the that first flow monitoring component 880. In addition, a terminal 882 extends from the sensor housing 910 and provides a power supply and a data communication channel, such as a wire, cable, or other data carrying component, that connect to the bus 882.

During operation, a flow rate of fluid flowing through each outlet 720 can be detected and independently adjusted through an operation of a respective valve assembly 800. A current actual flow rate can be determined from information generated as an impeller 830 rotates within a first end 814 of a respective valve assembly 800. As these actual flow rates are monitored, feedback including these readings is conveyed to the MCS 770. In turn, the valve assemblies 800 may be individually adjusted by the MCS 770 to compensate for increases or decreases in flow rates outside of a predetermined tolerance. Accordingly, the manifold 700 of the present disclosure can provide a closed loop system on each outlet 720 and fluid flow channels connected to that outlet 720.

More specifically with the exemplary manifold of FIG. 9, first flow monitoring components 880 of the sensor assembly 780 may include Hall effect devices, and the second flow monitoring components 840 installed in the impellers 830 may include magnets as previously described. In one example, two magnets on opposite side of an impeller 830 balance the impeller 830 and may generate two pulses per revolution. With this exemplary configuration, the Hall effect devices may generate pulses (positive or negative) every time a magnet passes that Hall effect device as a result of the rotation under a force of the fluid flowing through a first end 814, of an impeller 830 carrying that magnet. The pulses can then be transmitted to the MCS 770 via the bus 882 and connector 930 of the sensor assembly 780. A VOC controller, via a valve controller for a respective valve assembly 800 that transmitted the pulses or a processor of the MCS 770, can process these pulses in the form of signals and derive an actual flow rate and generate a GPM value.

Figure 10:
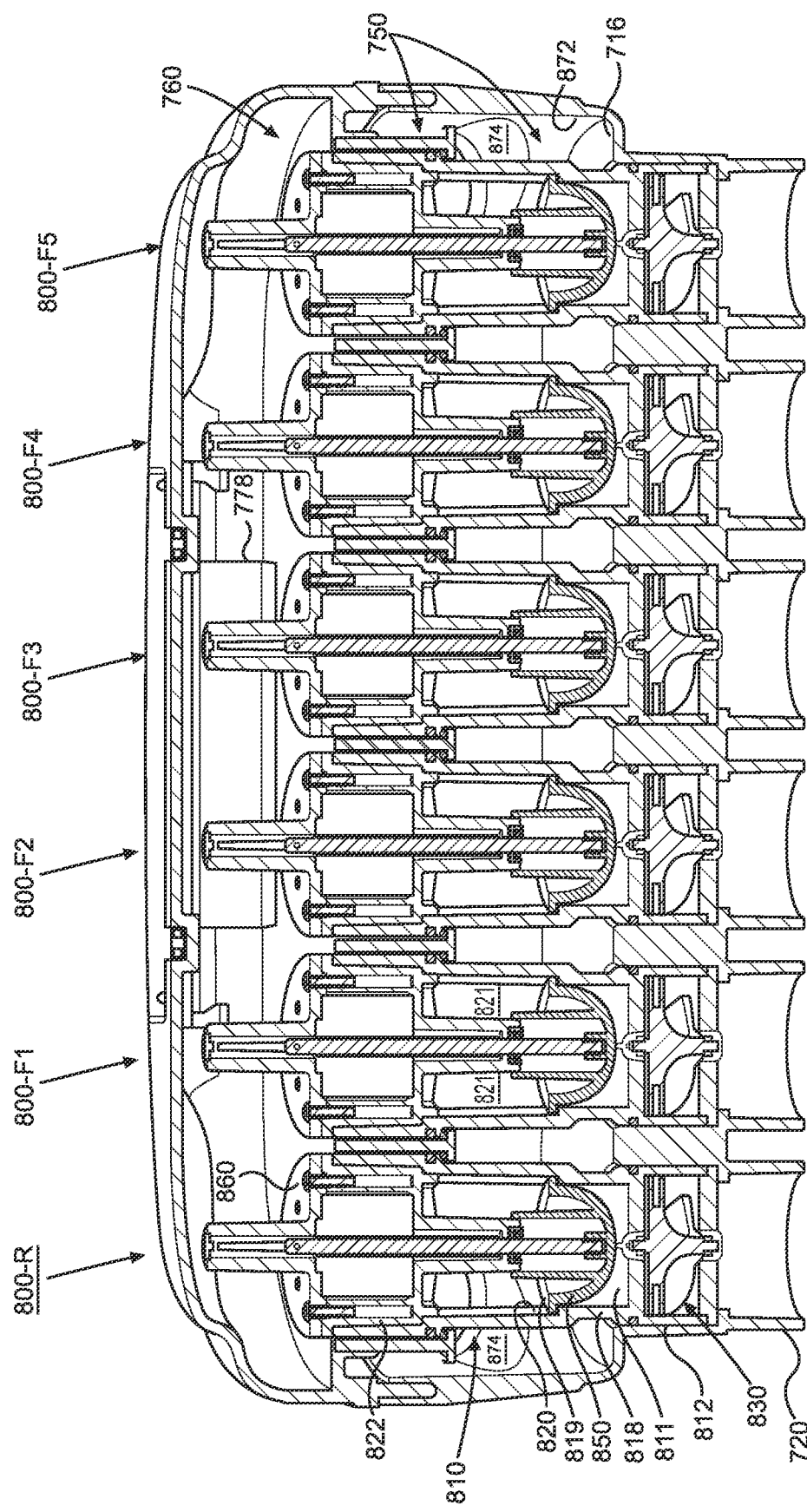
FIG. 10 is a sectional view of the fluid distribution manifold of FIG. 7 taken from a plane indicated by line 10-10.

FIG. 10 illustrates a sectional view of the fluid distribution manifold 700 taken from a plane indicated by line 10-10 in in FIG. 7A. With a common source of fluid, for example the pump 102 of the fluid system 100 of FIG. 1, connected to the inlet ports 874 of the manifold 700. Fluid will enter and fill the first chamber 750. Any one, or more than one, of the valve assemblies 800 illustrated in FIG. 10 may regulate fluid flow to a flow channel in fluid communication with a reservoir or recirculation line.

As shown, each of the valve assemblies in FIG. 10 include valve housings 810 that include wall segments 820 which define open chambers 821 surrounding respective valve members 850 upstream of respective valve seats 819. During operation, a valve member 850 for any of the valve assemblies 800 may be moved within an open chamber 821 defined by respective wall segments 820 toward or away from a valve seat 819 defined by a second end 818 of a respective first mating structure 812. Movement away from the valve seat 819 will allow or increase fluid communication between the open chamber 821 a fluid chamber 811 defined by the second end 818 downstream of the valve set 819. Each of the valve assemblies 800 being configured such that the first chamber 750 surrounding the wall segments 820, and thus the open chambers 821, provides a supply of fluid for which each valve assembly 800 regulates a flow of through a respective outlet 720.

For the purposes of explaining total flow balancing operation of the manifold 700, the first valve assembly on the left side of FIG. 10 has been designated with the reference numeral 800-R to indicate it regulates a flow of fluid to reservoir or a recirculation line and will be referred to as "bleed valve assembly 800-R." In addition, the remaining valve assemblies are labeled with and "-F" and number corresponding to a number of a fluid handling device it regulates flow to.

Together with the bleed valve assembly 800-R, the channel connected to a reservoir or recirculation line can be utilized as bleed passage to compensate for changes to required flow rates, or an input flow rate from a common fluid source. In the latter case, there could be an instance where an object or debris is stuck in a channel between a pump and tee connected to the inlet ports, or even a branch of the tee. In such a situation, were the bleed passage previously in an open or semi-open state, the reduced input flow rate would be detected through one or all the valve assemblies 800-F1 to F5 and the bleed valve assembly 800-R may be closed to increase fluid flow rate to all the other valve assemblies.

The manifold 700 of the present disclosure is configured to deliver precise specified flow rates from each of the outlets 720 illustrated in in FIG. 10, as described above. From a practical standpoint, the methods and systems described herein enable independent control of each of the valve assemblies 800-R, 800-F1 to F5 such that a first valve assembly 800-F1 can be adjusted in isolation, or in combination with a second valve assembly 800-F2 to obtain a desired flow rate through the first valve assembly 800-F1. In this second situation, an MCS can operate the valve assemblies 800-R, 800-F1 to F5 independently of one another, meaning their respective operations do not have to be simultaneous (although they can be achieved substantially simultaneously with the manifold 700 of the present disclosure).

Furthermore, especially in the case where three or more valve assemblies are provided, operation of the second valve assembly 800-F2 to compensate for a required flow rate increase or decrease for first valve assembly 800-F1, does not mandate that a required flow rate or a change in a required flow rate for the second valve assembly 800-F2 be ignored or addressed at a later time. Rather, the bleed valve assembly 800-R can be used to compensate for a change in required flow from any one or more of the valve assemblies 800-F1 to F5. In addition, where tolerances are used as discuss below, a third valve assembly 800-F3 could be operated to allow for adjustments to the flow rates through both of the first and second valve assemblies 800-F1, 800-F2.

In one example, an MCS can operate the valve assemblies 800 to obtain required flow rates within a standard range of deviation, ±5% of required flow rate for example. Accordingly, the MCS may operate several of valve assemblies, or several combinations of several valve assemblies, so that a flow rate through one particular valve assembly comes within that tolerance, while flow rates through other operated valve assemblies stay within the tolerance. Thus, the MCS may adjust one or more other valve assemblies 800 to deviate more from a current required flow rate than at the present moment, but still within the predefine standard range of deviation, to obtain this result.

Figure 11:
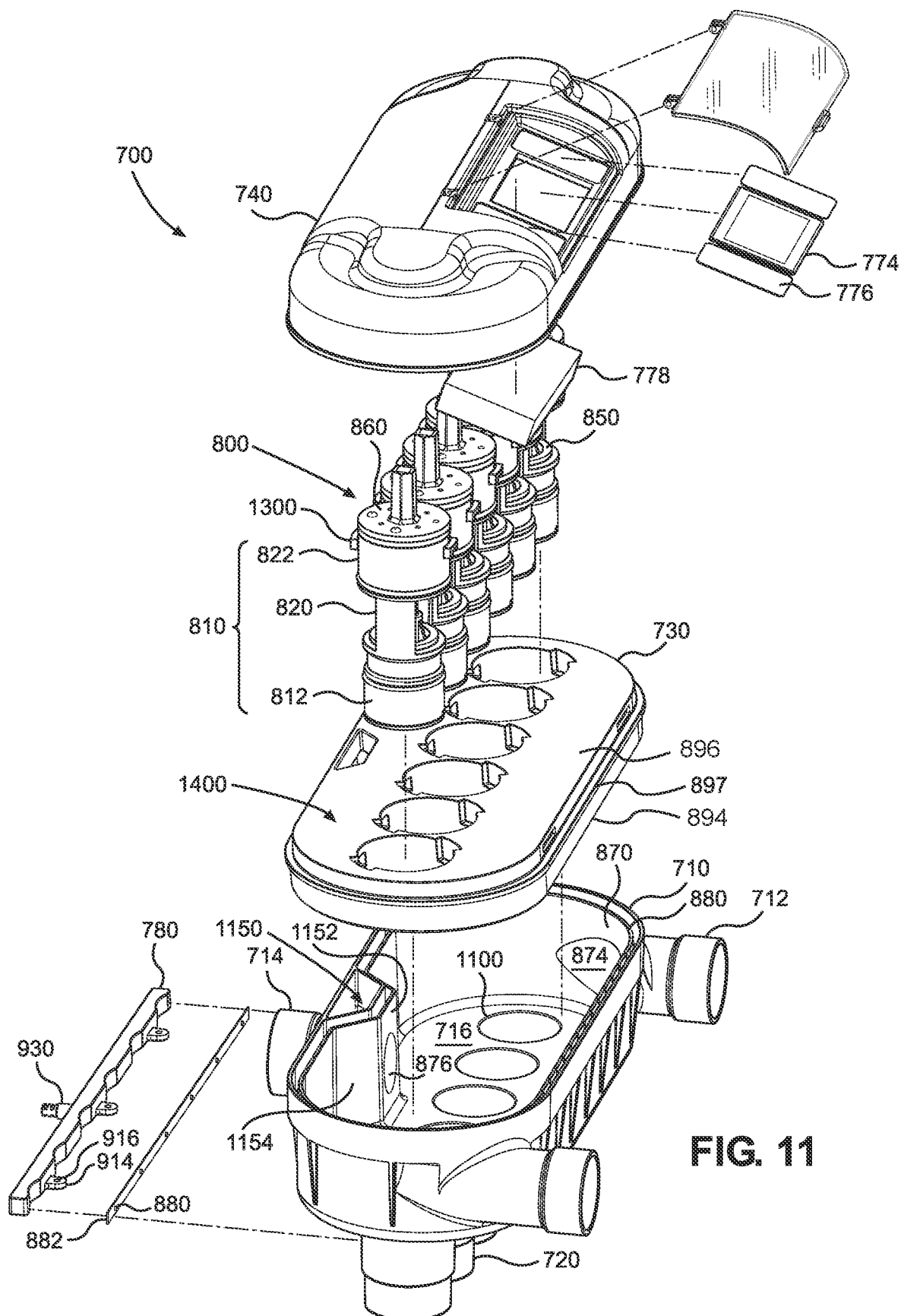
FIG. 11 illustrates an exploded view of a fluid distribution manifold illustrated in FIGS. 7A and 7B.

FIG. 11 illustrates an exploded view of a fluid distribution manifold illustrated in FIGS. 7A and 7B. As illustrated, the manifold 700 includes the first housing 710, the sensor assembly 780, the valve retainer 730, a valve assembly 800 for each slot 1400 in the valve retainer 730, and the second housing 740. The MCS 770, including the display 774, user interface controls 776, and the VOC controller 778, is integrated into the second housing 740. As shown in FIG. 11, the first housing 710 includes apertures 1100 formed in the lower wall 716, and a baffle 1150 within or otherwise a part of the surrounding wall 870. The baffle 1150 includes a planar surface 1152 and flanks 1154, with the pressure relief port 876 being defined in the planar surface 1152.

The exemplary manifold 700 of FIG. 11 includes six valve assemblies 800, however more or less valve assemblies can be provided in other example manifolds according to the present disclosure having different numbers of outlet ports (and corresponding numbers of slots in respective valve retainers. In other examples, the number of complete valve assemblies 800 can be less than the number of slots 1400 and outlets 720, where slots 1400 that do not receive complete valve assemblies are capped with covers.

The VOC controller 778 may be any type of computing device that includes one or more memory stores, one or more storage locations, and one or more processors configured to execute instructions. In one example, the VOC controller 778 may include a printed circuit board. In other examples, the VOC controller 778 may include information processing components that include, are integrated with, or otherwise define a processor or a group of processors, and are coupled with some type of memory and storage that may be provided by a physical hard drive or a solid-state drive.

Each of the valve assemblies 800 includes a cover 860, and a valve housing 810 including a first mating structure 812 connected to a second mating structure 822 by two or more wall sections 820. The wall sections 820 are spaced apart about a shape corresponding to cross-sections of the first and second mating structures 810, 822. During assembly of the manifold 700, the valve retainer 730 will be secured to the first housing 710. Further, each valve assembly 800 can be inserted into a first chamber 750 defined between the valve retainer 730 and the inner surfaces 817, 872 of lower and surrounding walls 716, 870 of the first housing 710, through a slot 1400 in the retention plate 893 of the valve retainer 730. The first mating structure 812 can pass through the slot 1400 formed in the retention plate 893 and be received by an aperture 1100 in the lower wall 716 of the first housing 710 that corresponds to the slot 1400.

Figure 12A:
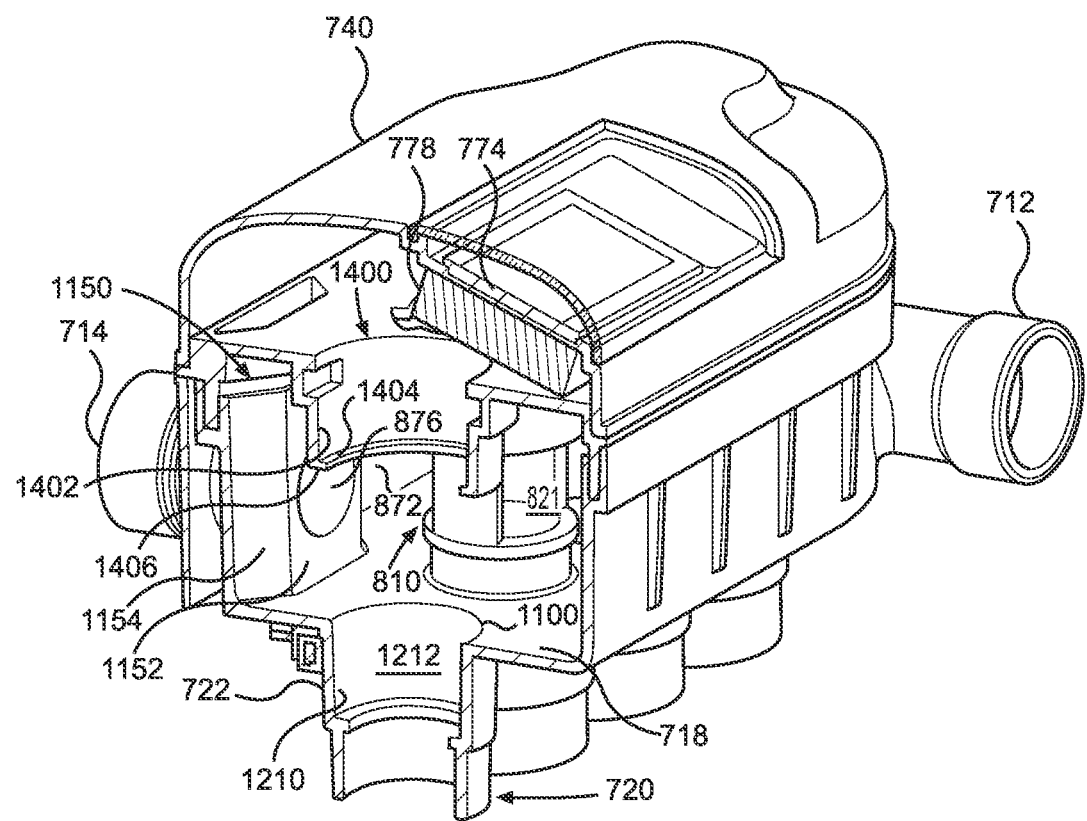
FIG. 12A illustrates a sectional view of a housing for a partially assembled fluid distribution manifold.

FIG. 12A illustrates a sectional view of a partially assembled version of the manifold 700 which provides a perspective view of the pressure relief port 876 that is in fluid communication with the pressure relief outlet 714. As shown, the pressure relief outlet 714 is: (A) in fluid communication with an aperture which defines the pressure relief port 876 and is formed in the baffle 1150 that extends inwardly into the first chamber 750 from the surrounding wall 870 of the first housing 710; (B) extends from the baffle 1150 through the surrounding wall 870; and (C) is configured to receive, or have integrally provided therein, a check valve or other type of pressure sensitive one-way valve (not shown). As shown the baffle 1150 includes a planar surface 1152 and two flanks 1154 that extend on opposite sides of the planar surface 1152 to the surrounding wall 872 of the first housing 710.

In one example, the baffle 1150 is shaped such that a cross-sectional area of the first chamber 750, along a plane parallel to the plane indicated by line 10-10 in FIG. 7A, is reduced around third and fourth outlets 720 (i.e., middle two outlet ports in the exemplary six outlet manifold 700 illustrated in FIGS. 7-11). Of the plurality of outlets 720, the third and fourth outlets 720 are the farthest from the inlet ports 874. Accordingly, the pathways for fluid to reach the valve assemblies 800 installed in these ports are longer, and more torturous as the fluid crosses over more flow rate affecting obstacles than fluid flowing to the valve assemblies 800 located closer to the inlet ports 874. The baffle 1150 reduces an area of the first chamber 750 proximate to the valve assemblies provided in the third and fourth outlet ports.

Reducing an area of the first chamber 750 around the valve assemblies 800 provided in the third and fourth outlet ports, can increase flow rate of fluid in and around those valve assemblies 800. Furthermore, the angle flanks 1154 may generate a jet effect in the areas of the first chamber 750 immediately surrounding open chambers 821 within which the valve members 850 for these valve assemblies 800 operation. As a result, the baffle 1150 may compensate for any reductions in flow rate because of the longer and more tortuous flow paths to these valve assemblies.

Figure 12B:
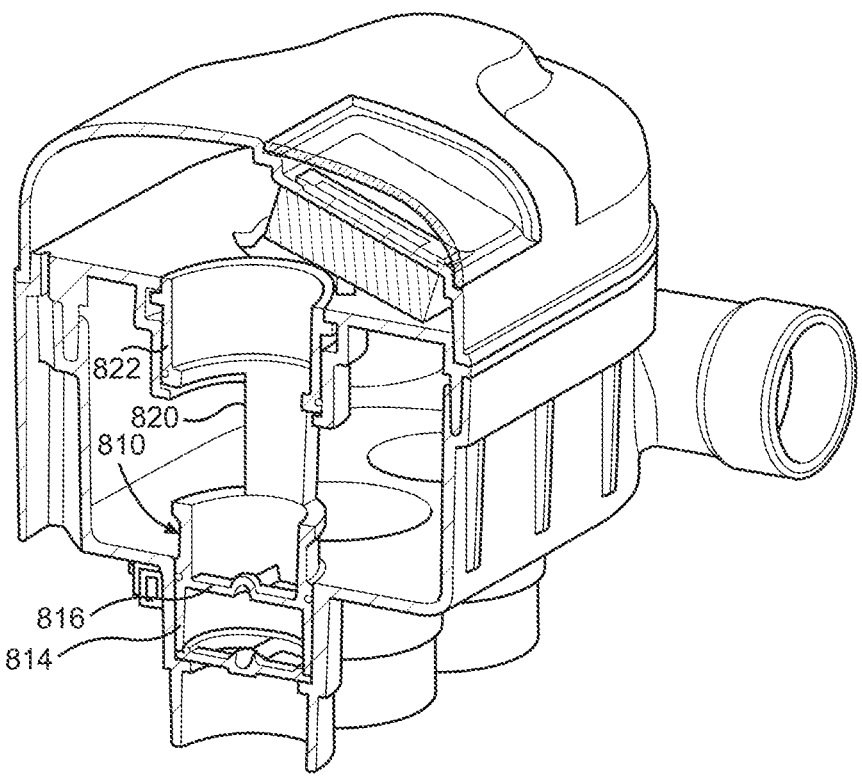
FIGS. 12B and 12C illustrate a sectional view of different partial assemblies of a fluid distribution manifold and a single valve housing.
Figure 12C:
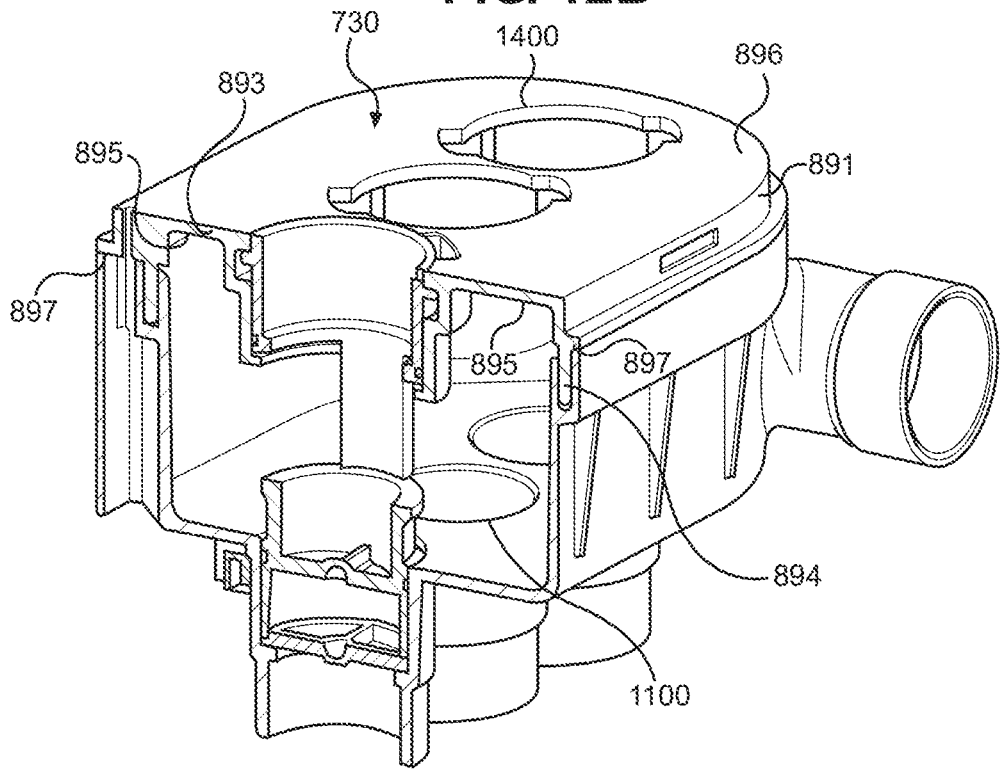

FIG. 12A provides a sectional view from the forth outlet 720 to provide contrasting views of a third and a fourth outlet 720 relative to an inlet port 874 corresponding to one of the inlets 712. More specifically, a sectional view of the fourth outlet 720, absent a valve assembly 800, and a perspective view of the third outlet 720 in which a valve assembly 800 is installed, are shown. FIGS. 12B and 12C illustrate a sectional view of different partial assemblies of the manifold 700 taken from the third outlet 720 from the inlet port 874. FIG. 12B provides a sectional view of the manifold 700 including all housing components, and a sectional view of only a valve housing 810 installed in the third outlet 720. Whereas FIG. 12C provides a sectional view of the manifold 700 with just the first housing 710 and valve retainer 730, and the sectional view of the valve housing 810 as in FIG. 12B. With FIGS. 12A, 12B, and 12C, and the following description, it will become apparent how the various components of the first housing 710 and the valve retainer 730 facilitate easy installation and removal of entire, or even portions of, valve assemblies 800 from the manifold 700.

With reference to FIG. 12A, an inner surface 1210 of the proximal end 722 of the fourth outlet 720 defines an open unobstructed space 1212. Further, there exists no components in a space between an aperture 1100 of the fourth outlet 720, and a bottom end face 1406 of a slot 1400 provided by the valve retainer 730. Accordingly, a valve assembly 800 can be easily inserted, in its entirety through the slot 1400 and into the proximal end 722 of the fourth outlet 720. This is especially the case because the second housing 740 can be removed from the valve retainer 730 as shown in FIG. 12C, without disturbing the positioning of the manifold 700, and without disturbing any positioning or operations of the valve assemblies 800.

FIGS. 12B and 12C also illustrate that a partial valve assembly 800 can be installed within the manifold 700. This means that for maintenance, capped versions of the valve housing 810 can be installed in outlet 720/slot 1400 combinations in place of valve assemblies that require maintenance or replacement. In addition, for systems having less fluid handing devices than the manifold 700 has outlet ports 720 (minus an outlet port connected to a reservoir or recirculation line), such capped valve housings 810-C (see FIGS. 13C and 13D) can be installed in those outlet 720/slot 1400 combinations that will not be connected to a fluid handling device. This also enables simple and convenient installations of additional fluid handling devices, or replacements of existing fluid handling devices. This is because piping downstream of the manifold for any one outlet port can be cut off from a supply of fluid simply by installing a capped valve housing 810-C in a respective outlet port/slot combination corresponding to that line of piping.

Thus, exemplary manifolds of the present disclosure enable simple and convenient physical installments of additional fluid handling devices. In addition, exemplary MCSs described herein enable seamless integration of the operations of those additional FHDs, into the coordinated operations of all the FHDs serviced by a manifold of the present disclosure.

Figure 13A:
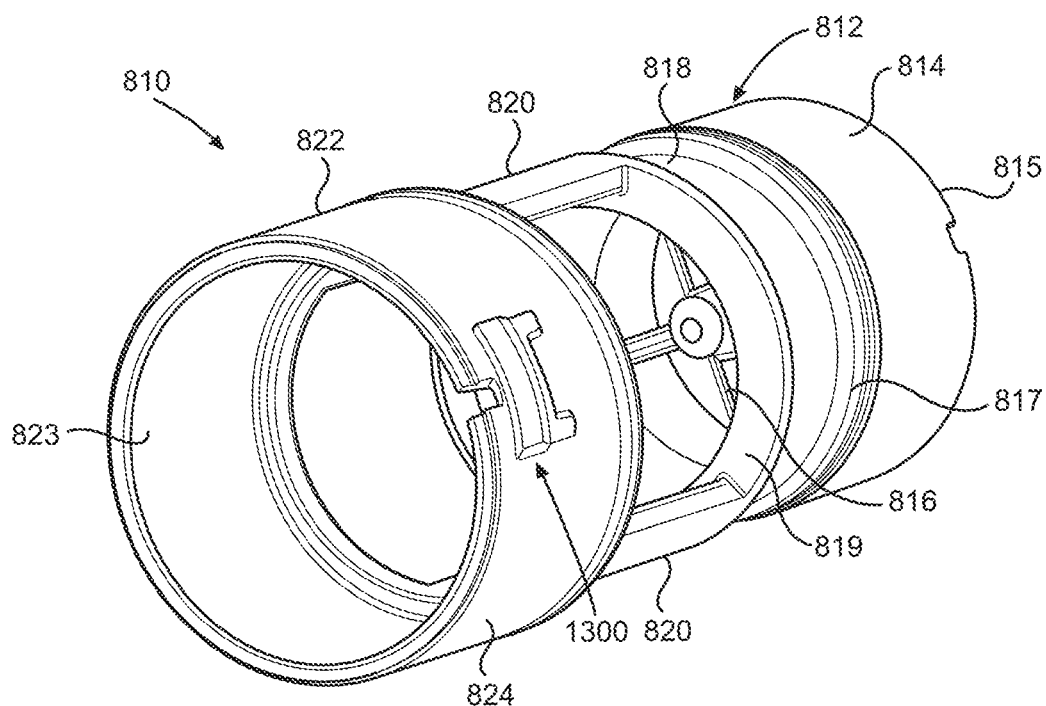
FIGS. 13A and 13B illustrate perspective views of a single valve housing.
Figure 13B:
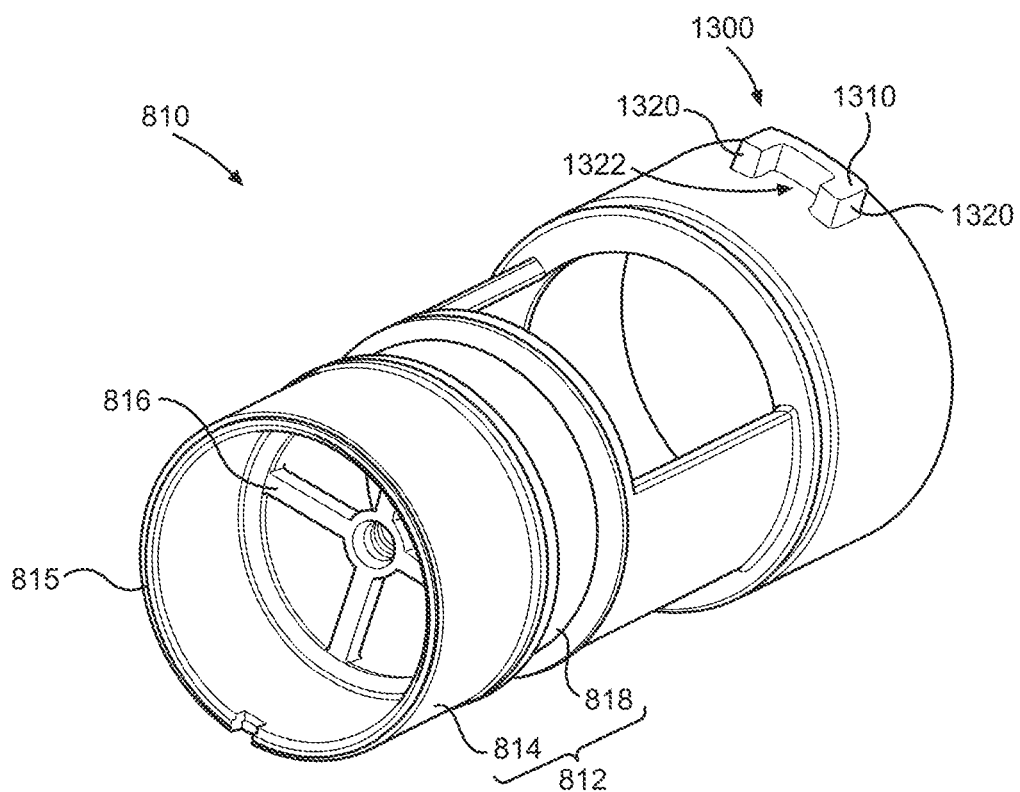

FIGS. 13A and 13B illustrate perspective views of a single valve housing, according to an aspect of the present disclosure.

Figure 13C:
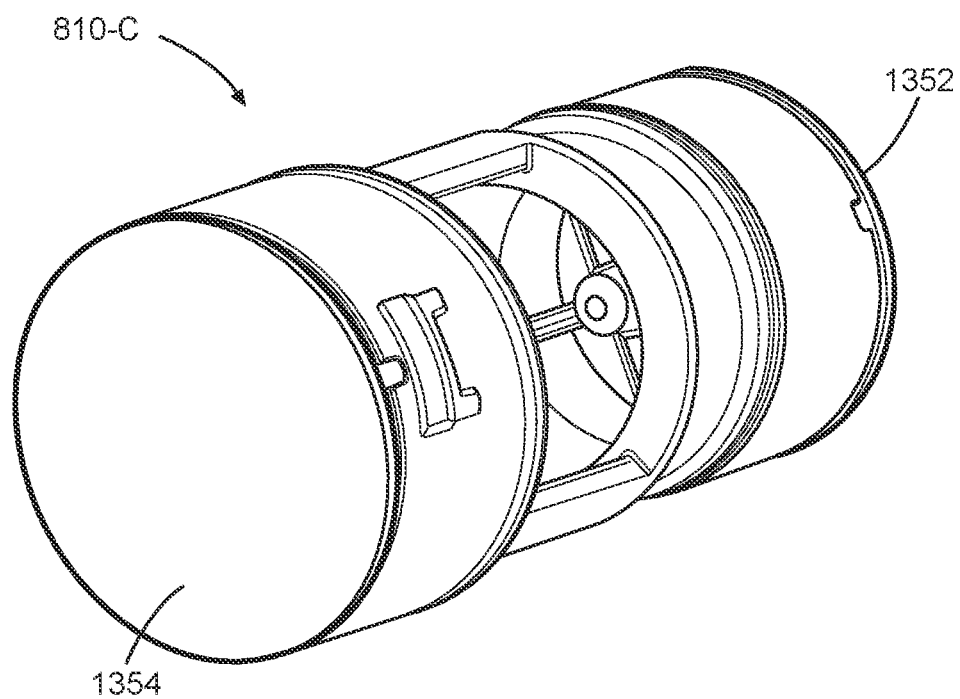
FIGS. 13C and 13D illustrate perspective views of a capped valve housing.

As previously discussed, the valve housing 810 may including the first mating structure 812 extending from two or more wall segments 820, which extend from the second mating structure 822. The first mating structure 812 includes the first end 814 that is sized so as to fit within a proximal end of an outlet port of a manifold as described herein. The first end 814 may define the first end face 815 configured to engage an end piece 848 (not shown) that secures an impeller 830 (not shown) within the first end 814, or a first end cap 1350 as shown in FIG. 13C.

The second end 818 of the first mating structure 812 may be separated from the first end 814 by the partition 816. An outer circumference of the first mating structure 812 may be formed with a recessed groove 817 to receive an O-ring. Above the partition 816 and the recessed groove 817, the second end 818 of the first mating structure 812 defines a bore or other shaped area that may receive a valve member (or portion thereof). The second end 818 of the first mating structure 812 defines a second end face 819 configured to provide a valve seat 819 for engaging valve members 850 (e.g., a plunger) of the valve assemblies 800.

Figure 14A:
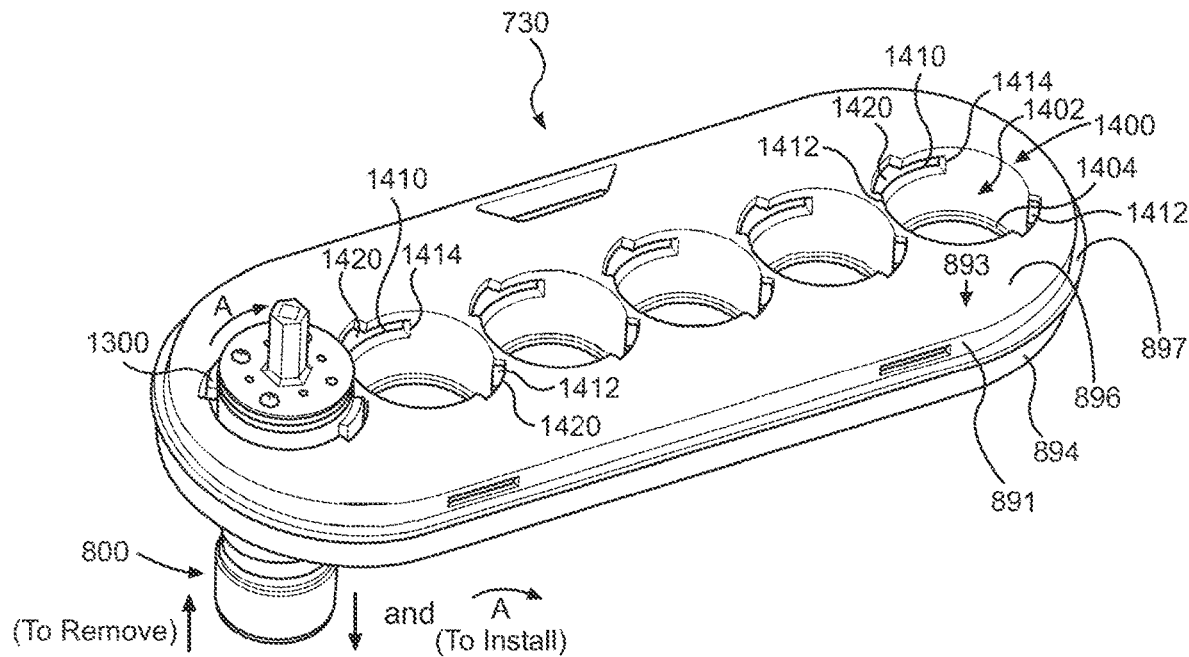
FIGS. 14A and 14B each illustrate perspective views of a first side of a valve retainer.
Figure 14B:
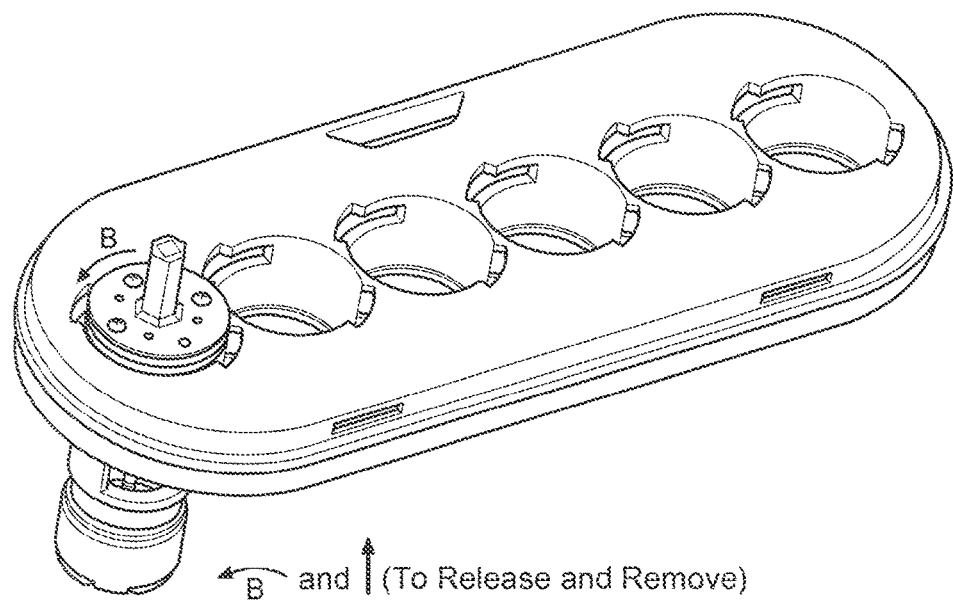

Turning to the second mating structure 822, an inner surface 823 may be specifically configured to receive and secure an actuator housing 854 of an actuator sub-assembly. An outer surface 824 on the other hand, may be provided with engagement members 1300 as shown, to facilitate an interlocking engagement with a slot 1400 of a valve retainer 730 as shown in FIGS. 14A and 14B.

In one example, the engagement members 1300 may include a horizontal body 1310, and legs 1320 extending from opposite ends of the horizontal body 1310 towards the first end 814 of the valve housing 810. An outer perimeter of the engagement member 1300 therefore defines a rectangular shape that may correspond to a recess provided in a valve retainer for receiving a valve assembly. Together with the horizontal body 1310, the legs 1320 can define a height of the engagement member 1300 substantially corresponding to height of a track of a slot of a valve retainer. Thus, the second mating structure 822 of the valve housing 810 is configured to slide in and be locked or otherwise secured to/within a slot. In another example, a recess 1322 defined between the legs 1322 can engage a protrusion formed within a slot.

The valve housing 810 can tightly fit into a proximal end of an outlet port, be interlocked into a position through and engagement with a slot of a retention plate of a valve retainer, and securely, but removably, retain an actuator of a valve assembly. As a result of the combined flexibility provided by how the valve housing 810 engages all these components, a substantial number of components provided in exemplary manifolds of the present disclosure can be serviced or replaced in isolation. Servicing or replacement may be accomplished, with little or no down time. In addition, additional sensors, such as temperature, salinity, chlorine, and other types of sensors can be added to one or more valve assemblies since the valve assemblies can easily be accessed by removing a second housing of a manifold. As previously noted, manifolds according to the present disclosure can continue to fully operate even with a second housing removed from a valve retainer.

Figure 13D:
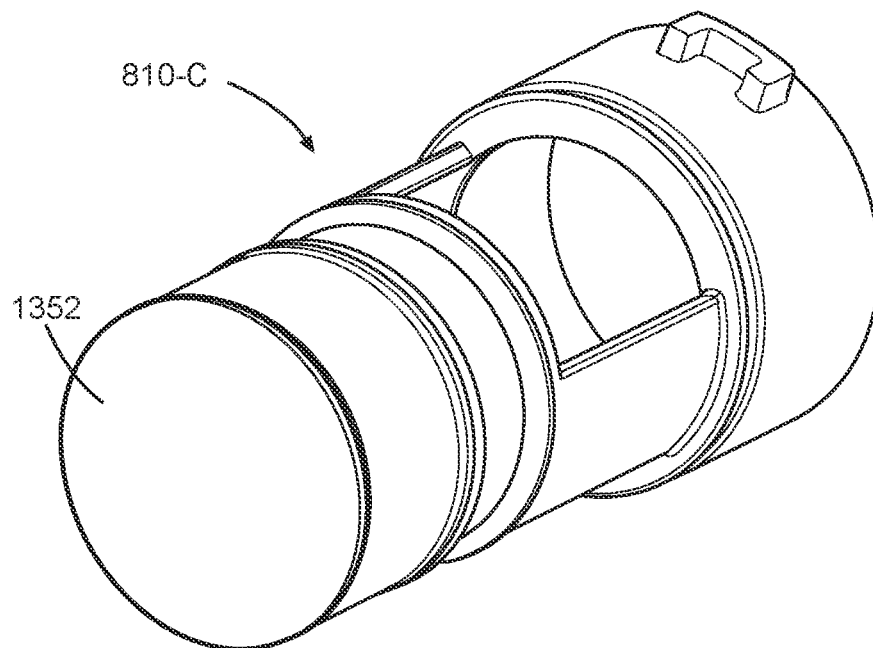

Sensor swaps and additions can be made with a simple swap of a given valve assembly for a capped valve housing 810-C, as shown in FIGS. 13C and 13D. As applied to the manifold 700 of FIG. 7, while a removed valve assembly 800 is retrofitted with a new sensor, or provided with a new actuator, valve member, or impeller, the FHD it served may be put offline and flow stopped thereto by a capped housing 810-C. The capped housing 810-C may include the valve housing 810 as shown in FIGS. 13A and 13B with a first end cap 1352 fitted on to the first end face 815 of the first mating structure 812, and a second end-cap 1354 fitted to an end face defined by the second mating structure 822. While the capped housing 810-C blocks fluid flow into the second chamber 760 of the manifold 700 and to an FHD the swapped valve assembly previously served, remaining FHDs connected to the manifold 700 may continue to operate fully.

Figure 15:
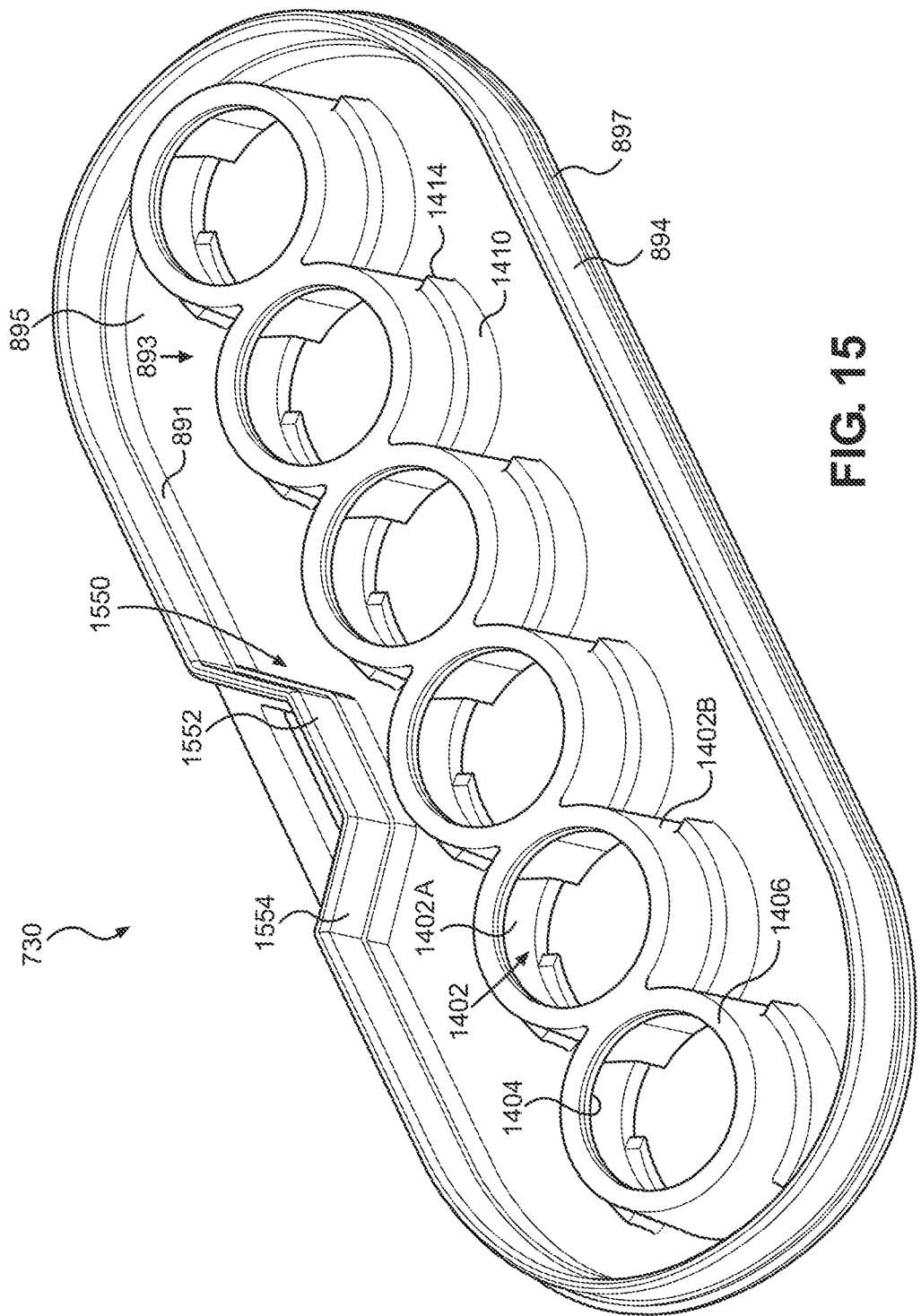
FIG. 15 illustrates a perspective view of a second side of a valve retainer.

FIGS. 14A and 14B illustrate a perspective view of the second surface 896 of the valve retainer 730, according to an aspect of the present disclosure. As shown in FIG. 14A, the second surface 896, which defines one side of the retention plate 893, is configured to receive valve assemblies. More specifically, each slot 1400 extending through the retention plate 893 of the valve retainer 730 is of a shape corresponding to a second mating structure 822 of a valve housing 810. In addition, each slot 1400 includes at least one track 1410 configured to interlock with an engagement member 1300 of the valve housing 810. In the example shown, each slot 1400 includes two tracks 1410. Each track 1410 is formed within or otherwise defined by a slot wall 1402 that extends from the first surface 895 of the valve retainer 730. As shown in FIGS. 14A, 14B, and 15, each slot wall 1402 defines the slot 1400 within the retention plate 893 between the second surface 896 and the first surface 895, and extends from the first surface 895 to a respective inwardly extending 1404. A first end 1412 of each track 1410 includes a recess 1420 formed in the second surface 896. A second end 1414 of the track 1410 may be defined in the slot wall 1402 at the end of an arc length relative to the first end 1412 having a central angle of 15° to 20°. It will be understood that the track can be longer or shorter such that it is of an appropriate length to ensure the valve assembly 800 is securely mounted to the retention plate 893 and thus the valve retainer 730.

As shown in FIG. 14A, the recess 1420 at the first end 1412 of each track 1410 may have a depth from a plane coinciding with the slot wall 1402 that substantially corresponds with a thickness of the engagement member 1300 extending from the valve housing 810. In addition, a dimension of the recess 1420 along the slot wall 1402 moving downward from the second surface 896 (referred to hereafter as a height of the recess), may be substantially equal to two times the combined height of the legs 1320 and the horizontal body 1310 of the engagement member 1300 shown in FIGS. 13A-13D. In this example, the height of the remaining length of the track 1410 may be at least that of the legs 1320 plus the horizontal body 1310. This is so the engagement member 1300 can slide from the first end of the track 1410 to, and be stopped at, the second end 1414 as shown in FIG. 14B, with a turn of the valve housing 810 in a first direction A.

In practice, the valve assembly 800 shown in FIGS. 14A and 14B, will be passed through the retention plate 893 of the valve retainer 730. With the engagement members 1300 aligned with the recesses 1420 in the first side as shown in FIG. 14A, the valve assembly 800 can continue moving through the retention plate 893 of the valve retainer 730 until the bottoms of the legs 1320 contact the bottom surfaces of the recesses 1420. From this position, the valve assembly 800 can be rotated in a first direction A until a lead edge of each engagement member 1300 comes into abutment with second ends 1414 of respective tracks 1410 as shown in FIG. 14B. Removing the valve assembly 800 will involve rotating the valve assembly 800 in a second direction B opposite of the first direction A, until leading edges of the engagement members 1300 for that rotational movement, abut the first ends 1412 of the tracks 1410. From this position, the valve assembly 800 can be pulled upward, out, and away from the valve retainer 730.

FIG. 15 illustrates a perspective view of the first surface 895 of the valve retainer 730. As shown, each of the tracks 1410 may be formed in or otherwise defined by an interior surface 1402A of a respective slot wall 1402, and can protrude outwardly from an exterior surface 1402B of the same slot wall 1402. In one example, each slot 1400 may include the inwardly extending lip 1404, which is shown and identified in FIGS. 12A, 14A, and 14B. The inwardly extending lip 1404 is configured to engage an end face of a second mating structure 822 of a valve housing 810 as shown in FIG. 8. A side of the inwardly extending lip 1404 opposite this engaging surface defines an end face 1406 of the slot 1400 which faces the lower wall 716 of the first housing 710 when attached thereto. All the slots 1400 are surrounded by the protruding edge 894, which includes a baffle section 1550 with a planar surface 1552 and flanks 1554 which correspond to the planar surface 1152 and flanks 1154 of the baffle 1150 of the first housing 710.

Figure 16:
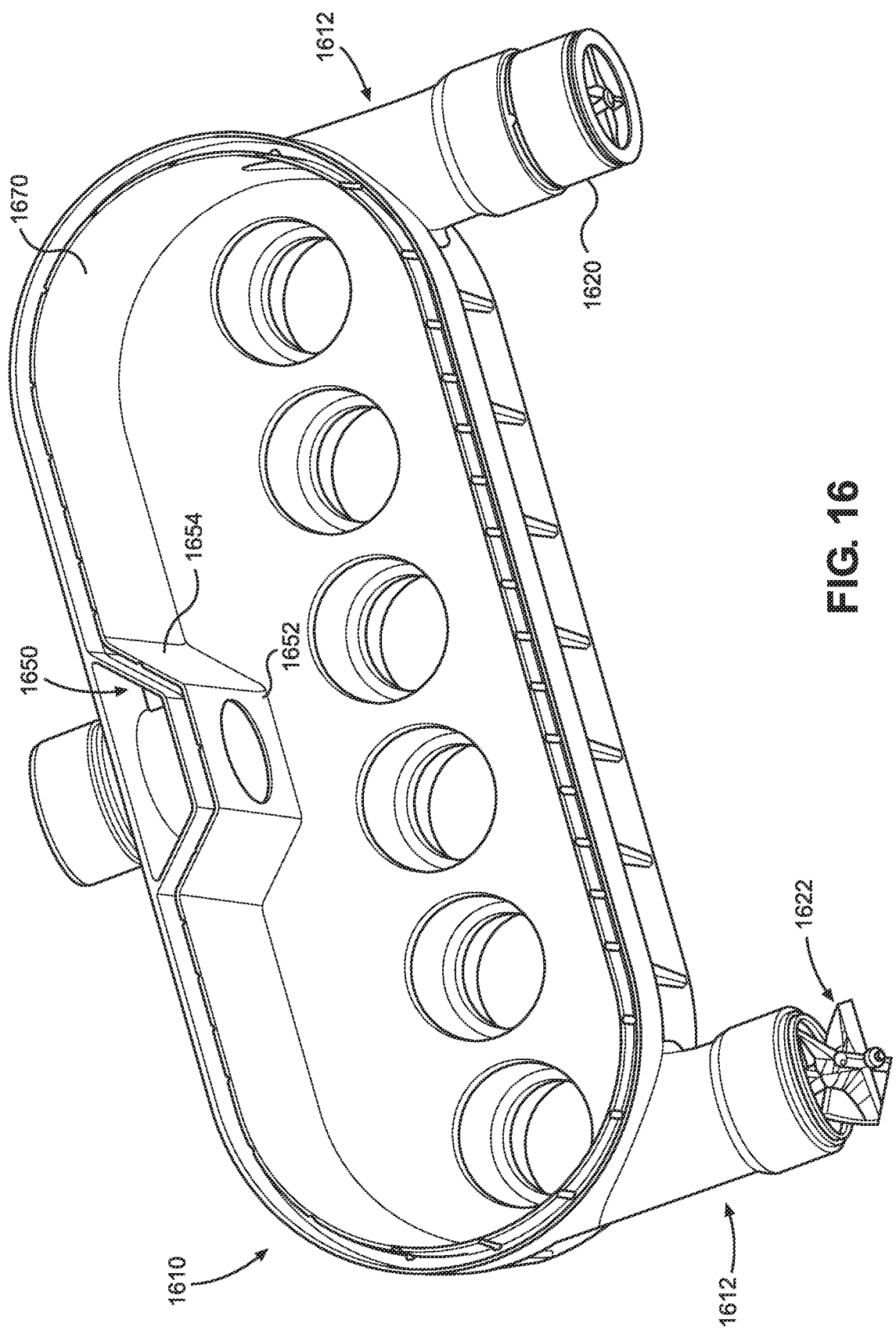
FIG. 16 illustrates a perspective view of a first housing for a fluid distribution manifold.

FIG. 16 illustrates a perspective view of a first housing 1610 for a manifold, according to an aspect of the present disclosure. In the example shown, each of two inlets 1612 are provided with impellers 1622 within collars 1620 that are fitted to ends of each inlet 1612. The impellers 1622 may be similar to the impellers of the valve assemblies described herein, and include magnets. Hall effect devices may be installed within the collars 1600. As fluid flows into the first housing 1610 through the inlet ports 874, impellers 1622 may rotate and the Hall effect devices may generate pulses as magnets in the impellers 1622 pass by. As a result, a flow rate of fluid in each branch of a tee, such as the tee illustrated in FIG. 1, can be known at all times.

FIG. 16 also provides another view of a baffle 1650 that defines a portion of a surrounding wall 1670 of the first housing 1610. As in other examples previously discussed, the baffle 1650 can be shaped such that a cross-sectional area of a first chamber is reduced around outlets that are furthest from the inlets. Reducing an area of the first chamber around valve assemblies provided in these outlet ports can increase flow rate of fluid in and around those valve assemblies.

Angled flanks 1654 may generate a jet effect in areas immediately surrounding spaces within which valve members for these valve assemblies operate. As a result, the baffle 1650 may compensate for any reductions in flow rate resulting from the longer and more tortuous flow paths to those valve assemblies.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A valve retainer comprising:
    a retention plate defined between a first surface and a second surface of the valve retainer;
    a plurality of slot walls extending from the first surface; and
    a side wall extending from the retention plate surrounding the plurality of slot walls,
    wherein the valve retainer is configured to separate a fluid distribution manifold into a first chamber and a second chamber, the first surface at least partially defining the first chamber and the second surface at least partially defining the second chamber,
    wherein the retention plate defines a plurality of slots corresponding to the plurality of slot walls,
    wherein each of the plurality of slots is defined between the second surface of the retention plate and a lip that is spaced away from the first surface of the valve retainer and extends inwardly from an interior surface of a respective slot wall, and
    wherein a flanged lip extends outwardly from the side wall in a direction away from the plurality of slot walls.

2. The valve retainer of claim 1, wherein each of the plurality of slot walls is defined by an interior surface and an exterior surface, and wherein at least one interior surface defines a track.

3. The valve retainer of claim 2, wherein the track includes a recess that is formed in the second surface and extends through the retention plate to a first end of the track defined by a respective slot wall.

4. The valve retainer of claim 2, wherein the track includes a first end and a second end defined within a respective slot wall, and wherein the track is further defined by a wall that protrudes outwardly from an exterior surface of the respective slot wall, and the wall extends from the first end to the second end of the track.

5. The valve retainer of claim 1, wherein a protruding edge extends from the flanged lip in a direction orthogonal to a plane of the flanged lip, and wherein the flanged lip is disposed between a first plane corresponding to the first surface of the valve retainer and a second plane corresponding with surfaces of the lips that extend inwardly from respective slot walls.

6. An assembly comprising:
    a valve retainer including:
        a retention plate defined between a first surface and a second surface of the valve retainer,
        a plurality of slot walls extending from the first surface, and
        a side wall extending from the retention plate surrounding the plurality of slot walls,
        wherein the valve retainer is configured to separate a fluid distribution manifold into a first chamber and a second chamber, the first surface at least partially defining the first chamber and the second surface at least partially defining the second chamber,
        wherein the retention plate defines a plurality of slots corresponding to the plurality of slot walls, and
        wherein a flanged lip extends outwardly from the side wall in a direction away from the plurality of slot walls; and
    a first valve housing configured to receive a valve member, the first valve housing including:
        a mating structure, and
        an engagement member extending outwardly from a surface of the mating structure,
        wherein the first valve housing is positioned within a first slot of the plurality of slots such that the mating structure abuts a first slot wall of the first slot, and
        wherein the engagement member is received in a track formed within the first slot wall.

7. The assembly of claim 6, wherein the first slot wall extends from the second surface of the valve retainer to a first lip that is spaced away from the first surface and extends inwardly from an interior surface of the first slot wall, and wherein the first valve housing is disposed in the first slot and extends away from the first surface past the first lip.

8. The assembly of claim 6, wherein the first slot wall is defined by an interior surface and an exterior surface, wherein the track is formed in the interior surface and the engagement member is positioned within the track.

9. The assembly of claim 8, wherein the track includes a recess that is formed in the second surface and extends from the second surface through the retention plate to a first end of the track.

10. The assembly of claim 9, wherein the recess is configured to accommodate a downward movement of the engagement member from the second surface into the track.

11. The assembly of claim 6, further comprising:
    a second valve housing;
    a first end cap; and
    a second end cap,
    wherein the second valve housing is disposed in a second slot defined by a second slot wall of the plurality of slot walls,
    wherein the first end cap is fitted on to a first end face of the first valve housing, and the second end cap is fitted on to a second end face defined by the mating structure, and
    wherein the second valve housing includes an actuator engaged with a prime mover that extends through the retention plate and connects to a valve member configured to engage a valve seat defined by the second valve housing.

12. A housing assembly for a manifold, the housing assembly comprising:
    a first housing including at least one inlet and a plurality of outlets;
    a second housing; and
    a valve retainer engaged with the first housing and the second housing,
    wherein the valve retainer includes:

a retention plate defined between a first surface and a second surface of the valve retainer, a plurality of slot walls extending from the first surface, and a protruding edge extending from a flanged lip and surrounding the plurality of slot walls, wherein the retention plate defines a plurality of slots corresponding to the plurality of slot walls, wherein the first housing defines a groove that receives the protruding edge, and wherein the second housing includes a rim that engages the flanged lip of the valve retainer.

13. The housing assembly of claim 12, wherein the first housing includes a surrounding wall and a baffle formed as part of the surrounding wall, wherein the first housing further includes a relief port that extends from the baffle through the surrounding wall.

14. The housing assembly of claim 13, wherein the valve retainer includes a baffle section corresponding to the baffle of the first housing.

15. The housing assembly of claim 12, wherein each of the plurality of slots of the valve retainer corresponds to a respective one of the plurality of outlets of the first housing.

16. The housing assembly of claim 12, further comprising:

a first valve housing including a first mating structure, a second mating structure, and wall segments extending between the first mating structure and the second mating structure, wherein the first mating structure is positioned in a first outlet of the plurality of outlets and the second mating structure is positioned within a first slot of the plurality of slots corresponding to the first outlet such that the second mating structure engages a first slot wall of the first slot.

17. The housing assembly of claim 16, wherein the first valve housing includes an engagement member extending outwardly from a surface of the second mating structure, and wherein the engagement member is engaged with the first slot wall.

18. The housing assembly of claim 17, wherein the first slot wall is defined by an interior surface and an exterior surface, wherein a track is formed in the interior surface and includes a recess formed in the second surface, wherein the recess extends from the second surface through the retention plate to a first end of the track and is configured to accommodate a downward movement of the engagement member from the second surface into the track.

19. The housing assembly of claim 16, further comprising:

a second valve housing, wherein the second valve housing is disposed in a second slot defined by a second slot wall of the plurality of slot walls of the valve retainer, wherein the first valve housing includes a first end cap and a second end cap, the first end cap fitted on to a first end face of the first valve housing, the second end cap fitted to a second end face of the first valve housing defined by the first mating structure, and wherein the second valve housing includes an actuator engaged with a prime mover that extends through the retention plate and connects to a valve member configured to engage a valve seat defined by the second valve housing.

20. A valve retainer comprising:

a retention plate defined between a first surface and a second surface of the valve retainer;

a plurality of slot walls extending from the first surface; and a side wall extending from the retention plate surrounding the plurality of slot walls, wherein the valve retainer is configured to separate a fluid distribution manifold into a first chamber and a second chamber, the first surface at least partially defining the first chamber and the second surface at least partially defining the second chamber, wherein the retention plate defines a plurality of slots corresponding to the plurality of slot walls, wherein each of the plurality of slots is defined between the second surface of the retention plate and a lip that is spaced away from the first surface of the valve retainer and extends inwardly from an interior surface of a respective slot wall, wherein each of the plurality of slot walls is defined by an interior surface and an exterior surface, and at least one interior surface defines a track that includes a first end and a second end defined within a respective slot wall, and wherein the track is further defined by a wall that protrudes outwardly from an exterior surface of the respective slot wall, and the wall extends from the first end to the second end of the track.

21. The valve retainer of claim 20, wherein the track includes a recess that is formed in the second surface and extends through the retention plate to a first end of the track defined by a respective slot wall.

22. The valve retainer of claim 20, wherein a flanged lip extends outwardly from the side wall in a direction away from the plurality of slot walls.

23. The valve retainer of claim 22, wherein a protruding edge extends from the flanged lip in a direction orthogonal to a plane of the flanged lip, and wherein the flanged lip is disposed between a first plane corresponding to the first surface of the valve retainer and a second plane corresponding with surfaces of the lips that extend inwardly from respective slot walls.

24. An assembly comprising:

a valve retainer including:

a retention plate defined between a first surface and a second surface of the valve retainer, a plurality of slot walls extending from the first surface, and a side wall extending from the retention plate surrounding the plurality of slot walls, wherein the valve retainer is configured to separate a fluid distribution manifold into a first chamber and a second chamber, the first surface at least partially defining the first chamber and the second surface at least partially defining the second chamber, wherein the retention plate defines a plurality of slots corresponding to the plurality of slot walls; and a first valve housing configured to receive a valve member, the first valve housing including:

a mating structure, and an engagement member extending outwardly from a surface of the mating structure, wherein the first valve housing is positioned within a first slot of the plurality of slots such that the mating structure abuts a first slot wall of the first slot, wherein the first slot wall is defined by an interior surface and an exterior surface, and the interior surface defines a track that includes a first end and a second end defined within the first slot wall, wherein the track is further defined by a wall that protrudes outwardly from the exterior surface of the first slot wall, and the wall extends from the first end to the second end of the track, and wherein the engagement member is received in the track formed within the first slot wall.

25. The assembly of claim 24, wherein the first slot wall extends from the second surface of the valve retainer to a first lip that is spaced away from the first surface and extends inwardly from the interior surface of the first slot wall, and wherein the first valve housing is disposed in the first slot and extends away from the first surface past the first lip.

26. The assembly of claim 24, wherein the track includes a recess that is formed in the second surface and extends from the second surface through the retention plate to the first end of the track.

27. The assembly of claim 26, wherein the recess is configured to accommodate a downward movement of the engagement member from the second surface into the track.

28. The assembly of claim 24, further comprising:

a second valve housing;

a first end cap; and a second end cap, wherein the second valve housing is disposed in a second slot defined by a second slot wall of the plurality of slot walls, wherein the first end cap is fitted on to a first end face of the first valve housing, and the second end cap is fitted on to a second end face defined by the mating structure, and wherein the second valve housing includes an actuator engaged with a prime mover that extends through the retention plate and connects to a valve member configured to engage a valve seat defined by the second valve housing.

* * * * *